US006965695B2

United States Patent
Yamakawa

(10) Patent No.: US 6,965,695 B2
(45) Date of Patent: Nov. 15, 2005

(54) METHOD AND SYSTEM FOR PROCESSING CHARACTER EDGE AREA DATA

(75) Inventor: Shinji Yamakawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 765 days.

(21) Appl. No.: 09/832,261

(22) Filed: Apr. 10, 2001

(65) Prior Publication Data

US 2002/0031263 A1 Mar. 14, 2002

(30) Foreign Application Priority Data

| Mar. 23, 2000 | (JP) | 2000-081520 |
| Apr. 10, 2000 | (JP) | 2000-107747 |
| Jun. 26, 2000 | (JP) | 2000-191580 |

(51) Int. Cl.[7] .............................................. G06K 9/48
(52) U.S. Cl. ................................. 382/199; 382/266
(58) Field of Search ........................ 382/162, 164–165, 382/168, 172, 176, 181, 190, 199, 209, 218, 254, 266, 288, 292

(56) References Cited

U.S. PATENT DOCUMENTS

| 5,331,442 A | * | 7/1994 | Sorimachi ................. 358/532 |
| 5,696,842 A | * | 12/1997 | Shirasawa et al. ......... 382/176 |
| 5,768,403 A | * | 6/1998 | Suzuki et al. .............. 358/2.1 |
| 6,600,832 B1 | * | 7/2003 | Nakayama et al. ......... 382/162 |

FOREIGN PATENT DOCUMENTS

| JP | 2-294884 | 12/1990 |
| JP | 2-295357 | 12/1990 |
| JP | 3-64251 | 3/1991 |
| JP | 2856867 | 4/1992 |
| JP | 5-292312 | 11/1993 |
| JP | 7-95397 | 4/1995 |
| JP | 9-247481 | 9/1997 |
| JP | 10-23251 | 1/1998 |
| JP | 10-108012 | 4/1998 |

OTHER PUBLICATIONS

Suen, et al. "Text string extraction from images of colour printed documents", IEEE, pp. 210–216, 1996.*

Huang, et al "Segmenting representing background in color images", IEEE, pp. 13–17, 1996.*

* cited by examiner

Primary Examiner—Daniel Miriam
(74) Attorney, Agent, or Firm—Knoble Yoshida & Dunleavy

(57) ABSTRACT

The quality of the reproduced image in separating the character portions and the areas near or surrounding the character portions has been improved. In particular, as the result of the character edge enhancement, the possibility for mistakenly processing white areas around the character edges has been substantially reduced and the correct detection rate for character edges in high line density areas has been substantially increased.

59 Claims, 19 Drawing Sheets

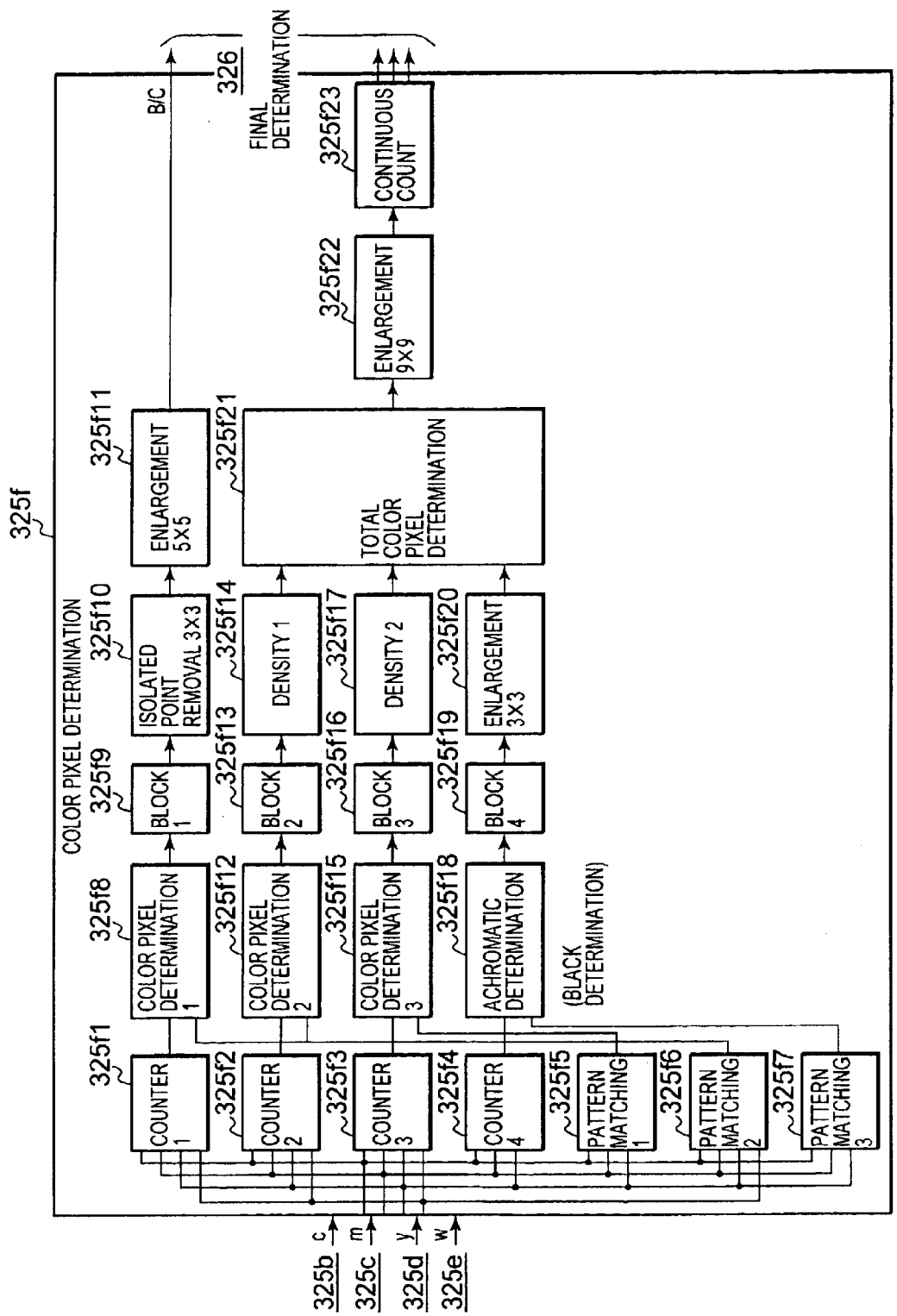

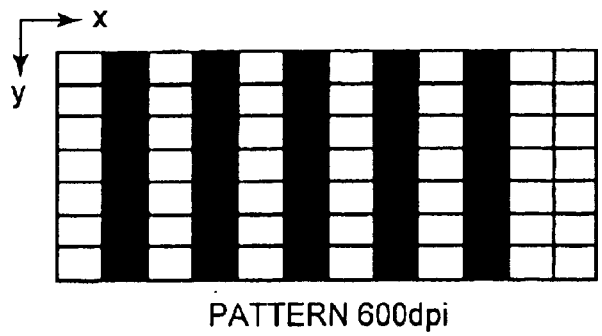
FIG. 8(A)
PATTERN 600dpi
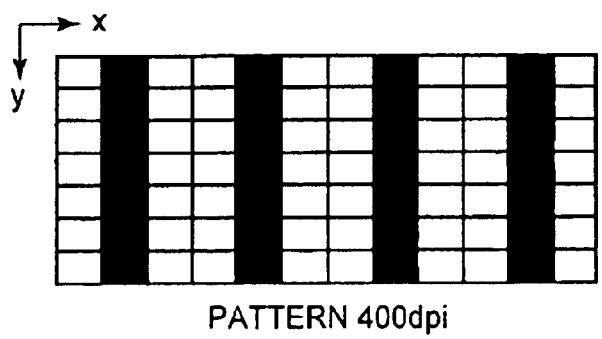
FIG. 8(B)
PATTERN 400dpi
FIG. 9
| BPa | BPb | BPc | BPd |
|---|---|---|---|
| 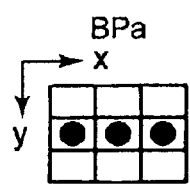 | 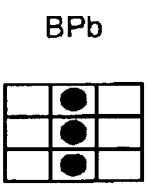 | 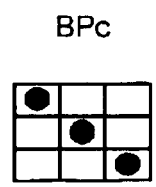 | 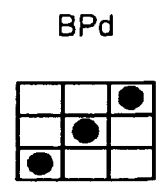 |
| WPa | WPb | WPc | WPd |
|---|---|---|---|
| 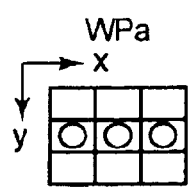 | 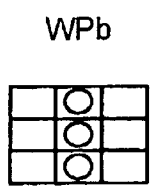 | 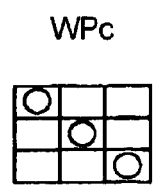 | 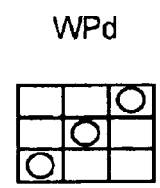 |

FIG. 14
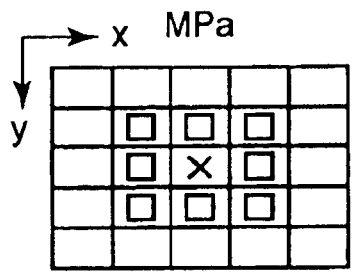
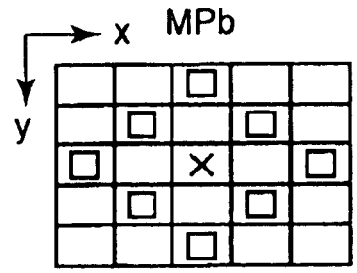
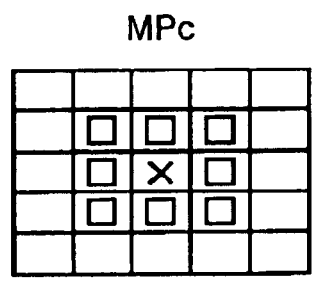
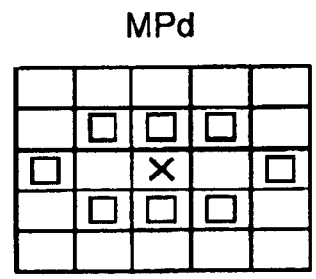
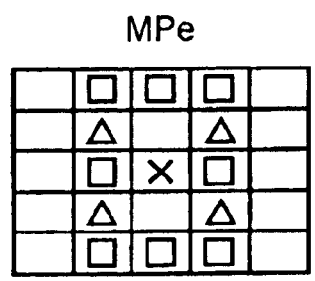
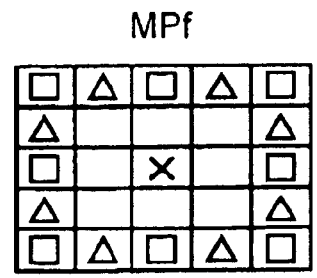
AMP
| S1 | S2 |
|----|----|
| S3 | S4 |

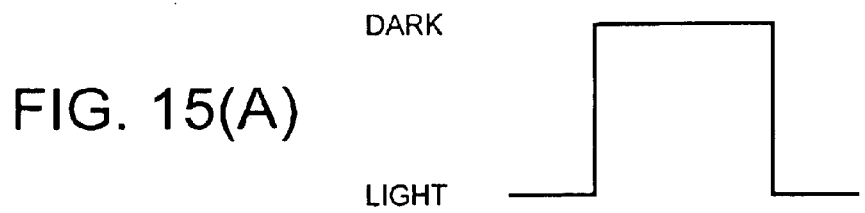
FIG. 15(A)
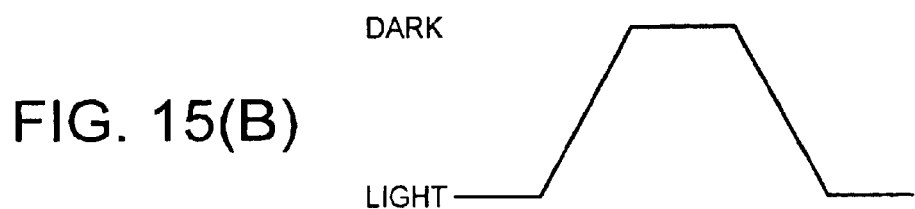
FIG. 15(B)
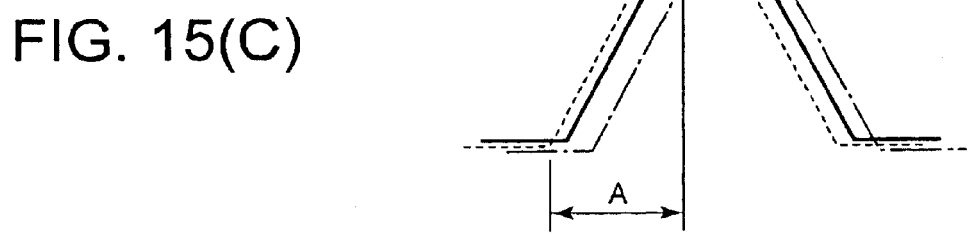
FIG. 15(C)
FIG. 16
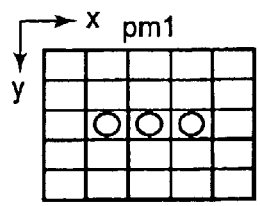
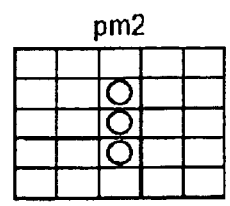
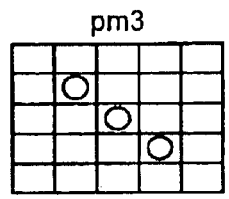
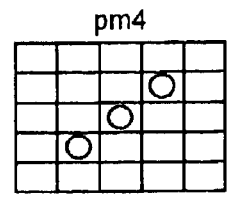

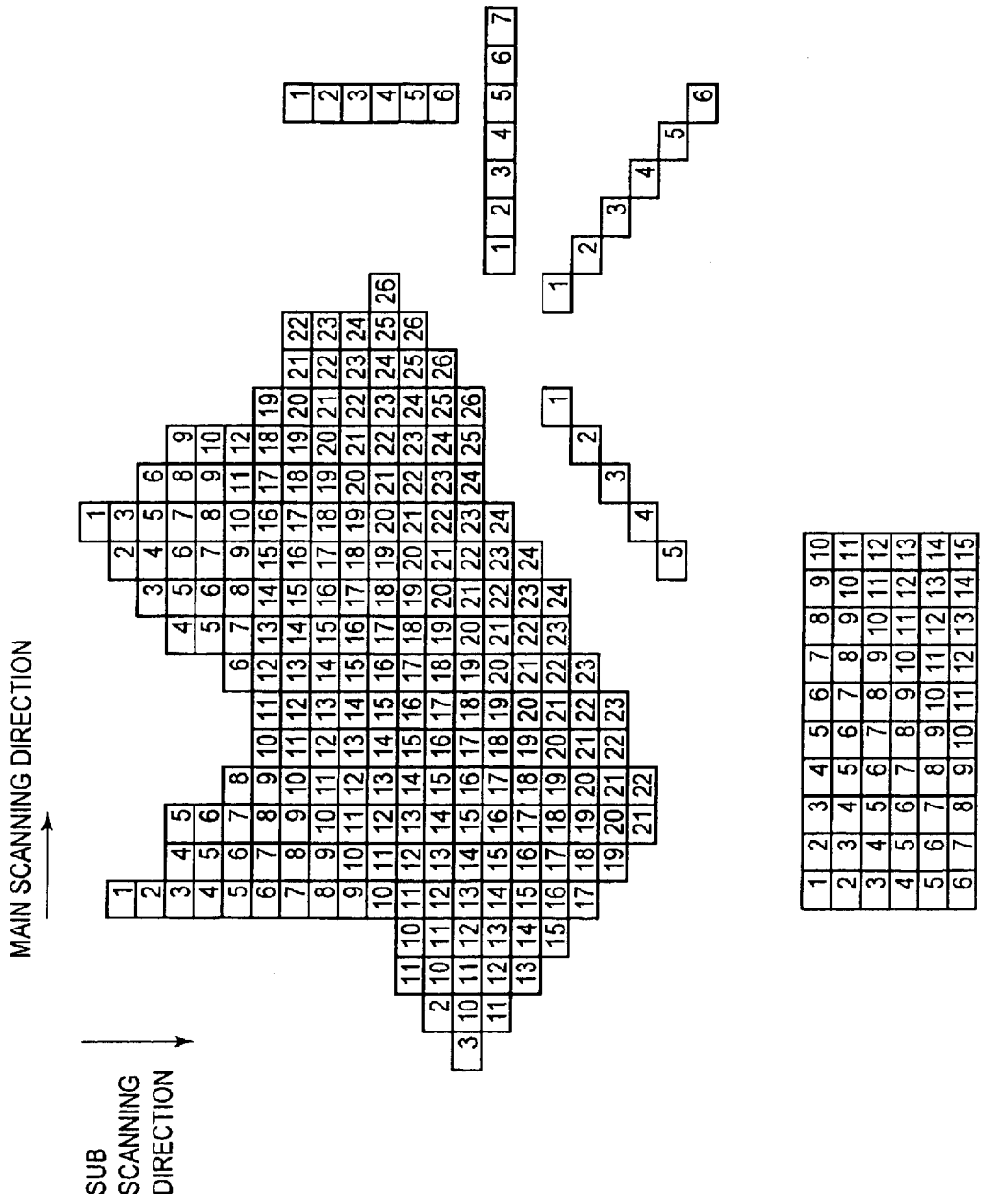

- Y COMPONENT IN BLACK IN PHOTOGRAPHIC MODE
- M COMPONENT IN BLACK IN PHOTOGRAPHIC MODE
- C COMPONENT IN BLACK IN PHOTOGRAPHIC MODE
- BK(GRAY) COMPONENT IN BLACK IN PHOTOGRAPHIC MODE
- BK(BLACK) COMPONENT IN BLACK IN PHOTOGRAPHIC MODE

FIG. 21(A)

|    | x1  | x2  | x3  | x4  |
|----|-----|-----|-----|-----|
| y1 |     |     |     |     |
| y2 | A21 | A22 | A23 | A24 |

FIG. 21(B)

|    | x1 | x2 | x3 | x4  |
|----|----|----|----|-----|
| y1 |    |    |    |     |
| y2 |    |    |    | B24 |

FIG. 21(C)

|    | x1 | x2 | x3 | x4  |
|----|----|----|----|-----|
| y1 |    |    |    |     |
| y2 |    |    |    | C24 |

FIG. 21(D)

|    | x1 | x2 | x3  | x4  |     |
|----|----|----|-----|-----|-----|
| y1 |    |    | Q13 | Q14 | Q15 |
| y2 |    |    | Q23 | Q24 |     |

Q24 ← CURRENT PIXEL

METHOD AND SYSTEM FOR PROCESSING CHARACTER EDGE AREA DATA

FIELD OF THE INVENTION

The current invention is generally related to a method of and a system for correctly processing data near character edges, and more particularly related to a method of and a system for correctly identifying areas near character edges based upon a set of predetermined tests.

BACKGROUND OF THE INVENTION

In the prior art image separation techniques, areas near edges of characters are mistakenly recognized as white areas when the characters are printed on non-white background of a certain shade of color. This because the character image data is processed by an edge-enhancement filter to restore clarity of the characters. However, when the background of the character image is non-white, due to the edge-enhancement filter, the areas near the character edges are affected to have an intensity level that is lower than the one before the edge-enhancement, and the lowered intensity level reaches a level of white color. Prior art image separation techniques for determining white regions often mistakenly consider these lowered intensity areas near character edges as white regions. Thus, the non-white background of a certain color is mistaken as white. Although the above described mistaken white regions are not an obvious eye sore if they are continuous, when characters have discontinuous areas, the above described mistaken white regions become eye sore as they appear randomly and hapharzardly around characters on a non-white color background.

To avoid the mistaken white region extraction, the relevant prior art techniques have used predetermined matching pixel patterns. On the other hand, these predetermined matching pixel patterns are insensitive to real white areas where there is a high-density of lines within a character. The predetermined matching pixel patterns are not able to distinguish line-dense portions in characters and also avoid the selection of these areas as white areas.

Relevant prior art techniques for edge detection used data that is highly sensitive to dark color or high intensity such as an intensity level and the green color component (G). Since the above data is not highly correlated to color, light colors especially yellow (Y) is not easily detected. As opposed to the above use of a single color component, other prior art techniques utilize a minimal value of each of the color component signals such as red (R), green (G) and blue (B) outputted by a scanner to extract image data characteristics. The use of the three color components such as R, G and B is susceptible to various factors such as the measurement location and ambient light. When a measurement location is not identical, edges tend to be emphasized. Especially due to a dot pattern screen angle of printed matter, the above described influence is significant. Although an edge-enhancement filter is applied to restore the blurred edges, the edge-enhancement filter should be color-component specific.

Japanese Patent Office Publication or JPOP02-294884 discloses an image separation technique to determine character regions based upon the lowest level color component image data. JPOP02-295357 discloses an image separation technique to determine a dot pattern based upon the lowest level color component image data.

JPOP 10-23251 discloses an image separation device and technique to tertiorize image data to extract white regions and black regions and the extracted regions are further compared to a set of predetermined matching patterns to select line image edges.

JPOP10-108012 discloses an image separation device and technique to detect edge areas, dot pattern regions, white background regions, and based upon the above detection, the regions are determined as a part of a character or a picture.

JPOP03-64251 discloses a control technique in which an operator modifies a SEG signal to determine a scanning direction intensity change detection level T1, a sub-scanning direction intensity change detection level T2, a diagonal scanning direction intensity change detection level T3 and a dot pattern determination level T4 for determining a character/picture determination so as to adjust priority for the character processing or the photograph processing based upon the character/picture determination.

JPOP05-292312 discloses a prior art technique to detect a dot pattern peak pixel and to determine a calculated value for distribution of the dot pattern peak pixel in a predetermined size area. The calculated value is compared to a threshold value to determine whether or not the predetermined size area is a dot pattern region. JPOP09-247481 discloses a prior art technique for dot pattern determination for each of C, M and Y image data.

Japanese Patent No. 2856867 discloses a prior art color processing device for applying single black color in a black character region that is a picture area which is surrounded by black character edge regions.

JPOP07-95397 discloses a prior art device to detect edges and high intensity regions in order to prevent the blurring of small characters and white regions inside thick lines of high-intensity thick characters. The prior art device recognizes that high-intensity regions surrounded by edges within a predetermined distance is a character region. The prior art device provides an appropriate process for each of the recognized regions.

It is desired that an image data processing technique should improve the quality of the reproduced image in separating the character portions and the areas near or surrounding the character portions. In particular, as the result of the character edge enhancement, it is desired to substantially reduce the possibility for mistakenly processing white areas around the character edges as well as to improve the correct detection rate for character edges in high line density areas so as to increase reliability in the reproduced image data. One of the factors in obtaining the above improvements is to select an appropriate mode for character data and graphics data. For example, the graphics mode is used for character or dot pattern screen image data that is on a light color background such as yellow.

SUMMARY OF THE INVENTION

In order to solve the above and other problems, according to a first aspect of the current invention, a method of correctly identifying areas near character edges in character image data, including: performing a combination of predetermined tests on a portion of the character image data representing a character and a background in sets of pixel color component values, the predetermined tests each determining whether or not the portion is a white area and generating a set of test results; assigning a white level value to the portion based upon the test results of the predetermined tests; comparing the portion to a set of predetermined white patterns if the white level value and the test results satisfy one of predetermined conditions; and converting each of the pixel values in the portion to white if the portion contains one of the predetermined white patterns to generate a white converted portion.

According to a second aspect of the current invention, a system for correctly identifying areas near character edges in character image data, including: an input unit for inputting character image data representing a character and a background in sets of pixel color component values; a white extraction unit connected to the input unit for performing a combination of predetermined tests on a portion of the character image data, the predetermined tests each determining whether or not the portion is a white area and generating a set of test results; a white determination unit connected to the white extraction unit for assigning a white level value to the portion based upon the test results of the predetermined tests; a white pattern matching unit connected to the white determination unit for comparing the portion to a set of predetermined white patterns if the white level value and the test results satisfy one of predetermined conditions; and a white correction unit connected to the white pattern matching unit for converting each of the pixel values in the portion to white if the portion contains one of the predetermined white patterns to generate a white converted portion.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6 is a block diagram illustrating one preferred embodiment of the color pixel determination unit according to the current invention.

FIG. 8 illustrate a striped pattern (A) at 600 dpi and a striped pattern (B) at 400 dpi.

FIG. 9 illustrates one example set of the 3×3 matching patterns.

FIG. 14 is an exemplary 5×5 pixel matrix mask to be used as a local area for masking.

FIG. 15 illustrates a comparison between an ideal RGB data reading characteristics and its distortion caused by the known sources.

FIG. 16 illustrates exemplary patterns in which a white circle indicates a matrix whose value has 1 in at least one of C, M and Y.

FIG. 19 is an example of the continuous color pixel count data.

FIG. 21 is a block diagram illustrating that the first number 2 indicates the current line Y2 while the first number 1 is indicates a previous line Y1. The second number indicates a X position on the line.

DETAILED DESCRIPTION OF THE PREFERRED EMBODIMENT(S)

Figure 1:
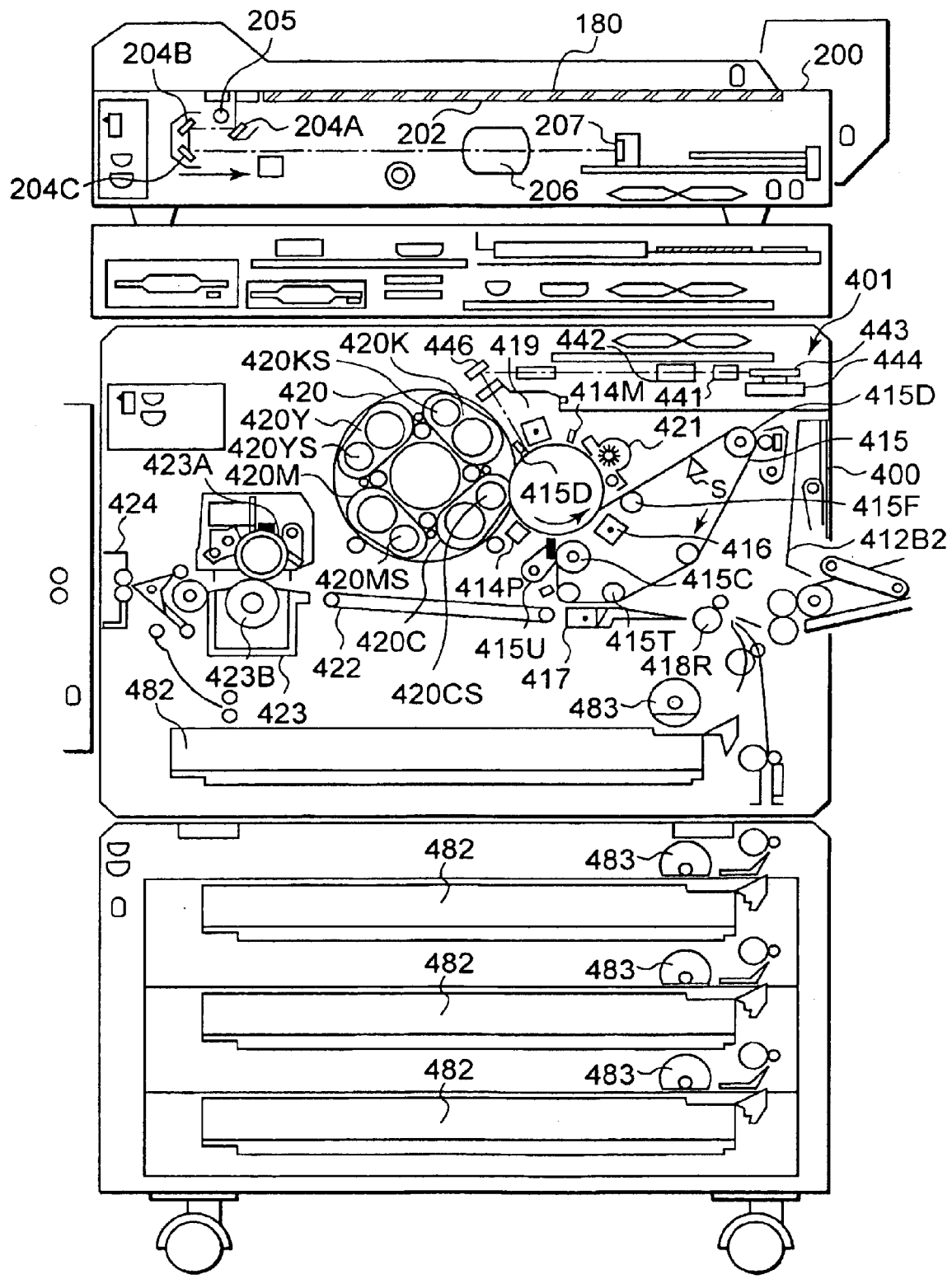
FIG. 1 is a diagram illustrating one preferred embodiment of the character edge area detection system according to the current invention.

Referring now to the drawings, wherein like reference numerals designate corresponding structures throughout the views, and referring in particular to FIG. 1, a diagram illustrates one preferred embodiment of the character edge area detection system according to the current invention. The preferred embodiment is a digital full color image duplicating machine and includes a color image reading device or scanner 200. The scanner scans a color image document 180 on a contact glass surface 202 for obtaining information such as red (R), green (G) and blue (blue) under a light source 205 through a color sensor 207 via a series of mirrors 204A, 204B and 204C as well as a lens 206 and converts the information into electrical signals. The color sensor 207 further includes for example, three-line CCD sensors for each of RGB color components. Based upon the intensity of the RGB color component signals, an image processing unit performs a predetermined color conversion or mapping process to convert the color image data signal into color image data including color components such as cyan (C), magenta (M), yellow (Y) and black (Bk) for color recording.

Using the above color recording data, a color image recording unit or color printer 400 forms an intermediate image in CMYBk on an intermediate transfer belt and transfers the image data onto an image-carrying medium such as a sheet paper. In response to a scanner start signal indicative of timing and movement, the light source/mirror optical system that includes the mirrors 204A, 204B and 204C and the light source 205 scans the document as indicated to the right as indicated by an arrow. For each scan, image data is obtained for one color component, and a corresponding color image is laid over an existing image so as to form a four-color-component image on the intermediate transfer belt.

The color printer 400 includes an optical write unit 401 as an exposing means which converts the color image data from the scanner 200 into optical signals and optically writes a static image corresponding to the original document on a photoreceptor drum 414. The optical write unit 401 further includes a laser transmitting unit 441, a laser control unit 401, a polygon mirror 443, a polygon mirror drive motor 444, a fθ lens 442, and a reflective mirror 446. The photoreceptive drum 414 rotates in a counterclockwise direction as indicated by an arrow, and the following units are located around the photoreceptor drum 414: a photoreceptor cleaning unit 421, an electrostatic discharge lamp 414M, an electrostatic charger 419, an electric potential sensor 414D for measuring the electrostatic level on the photoreceptor drum 414, a selected developer of a revolver-type developer unit 420, a developing level pattern detection unit 414P and the intermediate transfer belt 415.

The revolver-type developer unit 420 further includes a BK developer sub unit 420K, a C developer sub unit 420C, a M developer sub unit 420M, a Y developer sub unit 420Y and a revolver rotational unit (not shown in the figure) which rotates in a counterclockwise direction as indicted by an arrow. In order to form an electrostatic image, each of the developer sub units 420BK, 420C, 420M and 420Y further includes its developer releasing or sleeve portion 420KS, 420CS, 420MS and 420YS as well as a rotating developer paddle for agitating and moving developer and places its developer releasing or sleeve portion 420KS, 420CS, 420MS and 420YS in contact with the photoreceptor drum surface 414. While the revolver type developer unit 420 is in a waiting status, the BK developer unit 420BK is placed in a predetermined position for development. When a copying process starts, the scanner 200 initiates to read an image for the BK image data according to a predetermined timing. Based upon the BK image data, the scanner 200 optically writes an image and forms an electrostatic BK image. The above described process repeats for each of the C, M, Y color components. To develop from the beginning portion of the BK static image, the developer sleeve 420 KS is rotated before the beginning portion reaches the developing position of the BK developer 420K and continues the development of the BK electrostatic image area. When the end portion of the electrostatic image passes the BK static image position, the revolver developer 420 is rotated to position the BK developer 420K from the developing position and place another color developer at the developing position. The above described rotational movement must be completed at least before the beginning portion of a next image data arrives.

During the image forming cycle, the photoreceptor drum 414 rotates in a counterclockwise direction as indicated by an arrow while the intermediate transfer belt 415 rotates in clockwise direction as indicated by another arrow. As the intermediate transfer belt 415 rotates, each of the C, M, Y and BK toner images is sequentially formed on top of each other on the intermediate transfer belt 415. For example, the BK toner image is formed by the following sequence of steps. The charger 419 uniformly charges the photoreceptor surface 414 at −700 V by corona discharge, and the laser diode 441 exposes the photoreceptor surface by rasterizing according to the BK signal. When the raster image is exposed as described above, the original uniformly charged photoreceptor drum 414 loses the charge in the exposed area in proportional to the amount of optical exposure and thus forms an electrostatic image. Toner in the revolver-type developer 420 is negatively charged by agitating ferrite carrier. The BK developer sleeve 420KS is biased at a negative direct voltage in combination with an alternate voltage with respect to the metal photoreceptor drum surface 414. As a result of the above voltage relationship, toner does not attach in an area where the electro potential remains on the photoreceptor drum surface 414. On the other hand, the BK toner attaches in an area where the electro potential has been removed from the photoreceptor drum surface 414 by the exposing process so as to form a visible BK image that is identical to the electrostatic image.

The intermediate transfer belt 415 is supported by an operational roller 415D, a pairs of transfer rollers 415T, a cleaning roller 415C and a predetermined number of slave rollers. Although it is not shown in FIG. 1, a drive motor rotates the transfer belt 415. The above described BK toner image on the photoreceptor drum surface 414 is transferred by a belt transfer corona discharge unit or belt transfer unit 416 onto the intermediate transfer belt 415 that is in contact with the photoreceptor drum surface 414 and is rotated at the same rotational speed as the photoreceptor drum 414. This toner transfer process is hereinafter called a belt transfer. A photoreceptor cleaning unit 421 cleans a minute amount of residual toner on the photoreceptor drum 414 after the belt transfer for recycling. The collected residual toner is stored in a cleaner toner tank.

After overlapped layers of the C, M, Y and K toner image are formed on the intermediate transfer belt 415 from sequentially formed and transferred separate C, M, Y and K toner images on the photoreceptor drum 414, the corona discharge transfer unit 416 simultaneously transfers the multiple-layer toner image onto a sheet of an image-carrying medium. After the BK image process, the C image process starts and the scanner 200 initiates to read the C image data at a predetermined timing. The C image is subsequently formed by writing with laser according to the C image data. The C developer 420C initiates the rotation after the end portion of the BK image passes but before the beginning of the C image arrives so as to prepare the development the corresponding C image at the developing position using the C toner. The C image development process continues. Similarly, after the end portion of the C electrostatic image passes but before the beginning of the M electrostatic image arrives, the revolver type developer 420 rotates to send the C developer 420C out of the developing position and to receive the M developer 420M in the developing position. Then, the above described processes repeat for the M image data.

The belt cleaning unit 415U further includes an entrance seal, a rubber blade, an output coil and contact elements for the above elements. After the first color BK image is belt transferred, while the subsequent color component images are being belt transferred, the entrance seal and the rubber blade are kept out of contact with the intermediate transfer belt 415.

As described above, the paper transfer corona discharge unit or paper transfer unit 417 transfers the overlapping toner image onto paper by applying predetermined AC/DC or DC voltage onto the paper or the intermediate transfer belt 415.

The paper cassette 482 stores various sizes of paper. A specified size of the paper is transferred from the paper tray towards resist rollers 418 via paper feeder roller 483. A thick medium feeder tray 412B2 feeds thick image-carrying medium such as OHP sheet and thick paper. Around the image formation starts, an image-carrying medium is provided from one of the above image-carrying storage units and waits at a nip portion of the resist roller pairs 418R. When the beginning portion of the toner image on the intermediate transfer belt 415 reaches the paper transfer unit 417, the resist rollers 418 is activated to synchronously move the paper and the image. Thus, the paper is placed over the toner image on the intermediate transfer belt 415 and passes over the positively charged paper transfer unit 417. Since the paper is biased by the positive voltage due to the corona discharge current, almost all toner is transferred onto the paper. Subsequently, the paper is discharged as it passes a discharge brush, is detached from the intermediate transfer belt 415 and placed on paper transfer belt 422. The paper with the transferred toner image is transferred to a fixer 423 so as to fix the toner image at a fix roller 423A at a predetermined temperature and a pressure roller 423B. The output roller 424 outputs the fixed paper to the outside copy tray.

After transfer, a photoreceptor drum cleaning unit 414 cleans the photoreceptor drum surface 414 by a brush roller and a rubber blade, and a discharge lamp 414M uniformly discharges the photoreceptor drum surface 414. Similarly, after the transfer, the cleaning unit 415U cleans the intermediate transfer belt 415 by pressing the surface with the cleaning blade. When a repeat copy is performed, after the process associated with the fourth color component of a first copy is complete, a new process associated with the first color component is initiated for a second copy. The intermediate transfer belt is also similarly prepared for the second copy.

In general, the above described preferred embodiment is a multi-function image duplicating device that includes a color printer 400 which prints out a color image in response to print data via a personal computer through LAN or parallel I/F, the scanner 200 or a facsimile via public telephone network or PBX.

Figure 2:
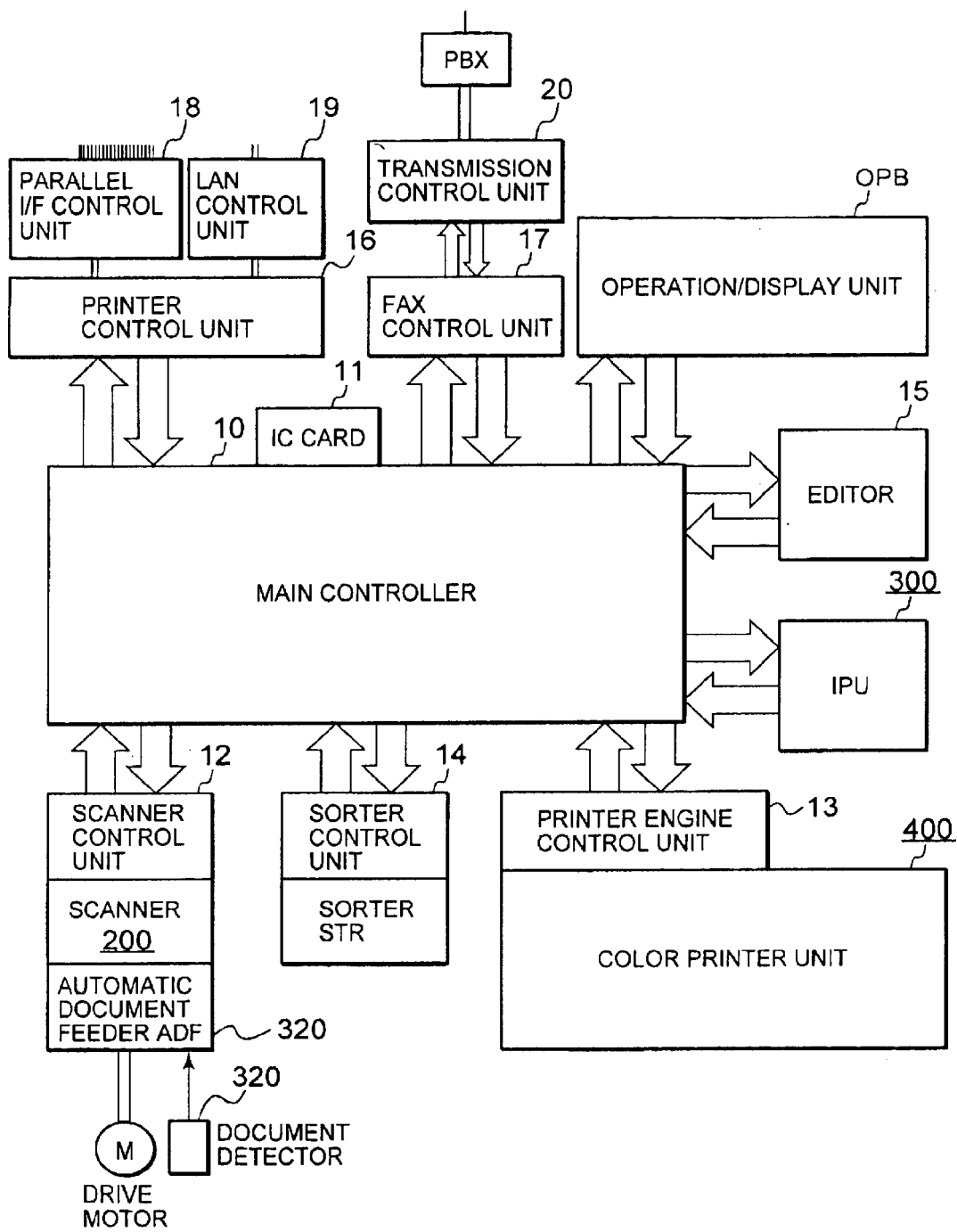
FIG. 2 is a block diagram illustrating input output signal among the components of the preferred embodiment according to the current invention.

Now referring to FIG. 2, a block diagram illustrates input output signal among the components of the preferred embodiment according to the current invention. A main control unit 10 controls the image-duplicating device and is connected to various control units such an operator display and input unit OPB which displays information to an operator as well as receive inputs from the operator via input keys. Other control units include an editor 15, a scanner/automatic document feeder control unit 12, a printer controller 15, a fax controller 17, a sorter controller 14, an image processing unit (IPU) 300 and an engine controller 13. The main controller 13 and the above listed controllers communicate as necessary on the status of components as well as send/receive commands. The engine controller 13 controls biasing, exposure, development, paper supply, transfer, fixing and paper transfer. A main motor and various clutches are also connected to drivers that are not shown in the main controller 10.

Still referring to FIG. 2, the color printer 400 includes electronic circuits, various sensors and control circuits to control supplying paper, charging the photoreceptor drum 414, exposing an image via a laser unit, developing the image, transferring the image, fixing the image and outputting the paper. The parallel interface controller 18 and the LAN controller 19 receive print commands and print image data. The printer controller 16 processes the print image data and the print commands from an outside unit such as a personal computer and generates a printable bit map. The printer controller 16 further initiates the printer 400 via the main controller 10 to print the image. The fax controller 17 initiates the scanner 200 and the IPU 300 via the main controller 10 in response to transmission and reception commands. In case of the reception command, the IPU 300 receives the data and the printer 400 prints out an image. On the other hand, in case of the transmission command, the fax controller 17 transmits the image data via the transmission control unit 20 and the PBX.

Figure 3:
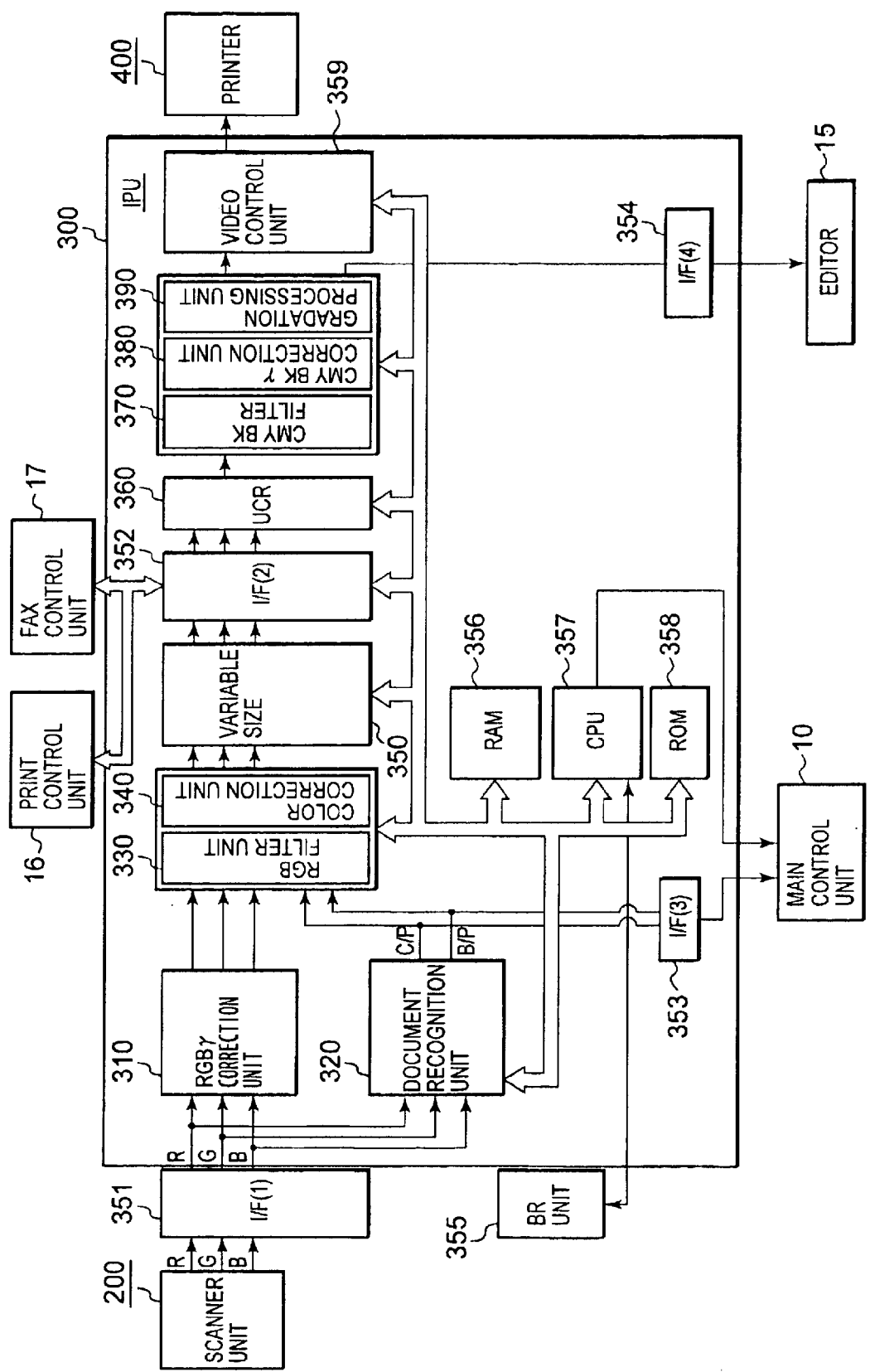
FIG. 3 is a block diagram illustrating the preferred embodiment of the image processing unit (IPU) according to the current invention.

Now referring to FIG. 3, a block diagram illustrates the preferred embodiment of the image processing unit (IPU) 300 according to the current invention. The scanner 200 generates the RGB image data and sends it via an interface 2 (I/F) unit 351 to the IPU 300. In a BR mode, a BR unit 351 instructs a central processing unit (CPU) 357 to process the B or R single color component. The IPU 300 includes a random access memory (RAM) 356, a central processing unit 357, and a read-only memory (ROM) 358. The IPU 300 converts the RGB image data which is reflective rate data into the CMYK data which is intensity data via a RGB γ correction unit 310, a RGB filter unit 330, a color correction unit 340, a variable size unit 350, an interface (I/F) unit 352, UCR 360, a CMYK filter 370, a CMYK γ correction unit 380, and a gradation processing unit 390. To help the conversion, the document recognition unit 320 determines that the RGB data contains character areas which include lines/characters and or picture areas which include pictures or photographic images. Based upon the above determination, the document recognition 320 outputs a C/P signal or B/C signal to the RGB filter 330 and the main controller 10 via an interface 3 unit 353. The C/P signal is a 2-bit signal indicative of the following:

"11" indicates that an area is a character area;
"01" indicates that an area is a character inner space area; and
"00" indicates that an area is a picture/graphic area.

The B/C signal is a single bit signal and indicates the following:

"0" indicates that an area is chromatic; and
"1" indicates that an area is achromatic.

Figure 4A:
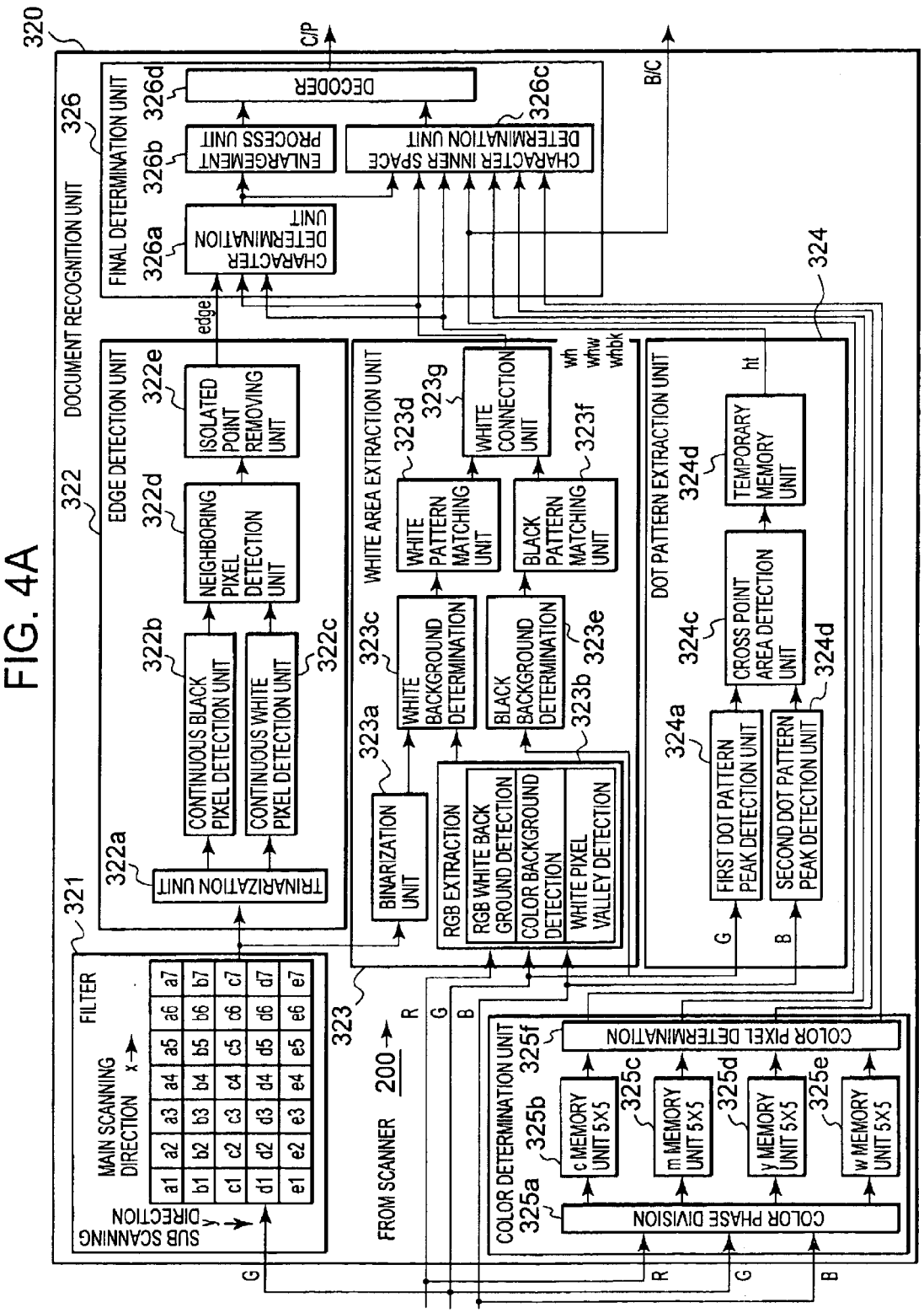
FIG. 4A is a block diagram illustrates a first preferred embodiment of the document recognition unit according to the current invention.

Referring to FIG. 4A, a block diagram illustrates the preferred embodiment of the document recognition unit 320 according to the current invention. As described above, the document recognition unit 320 performs a character edge detection process, a character inner space detection process, a picture detection process, a chromatic detection process and a achromatic detection process and generates the C/P signal indicative of a character edge area, a character inner space area or a picture area as well as the B/C signal indicative of a chromatic area or an achromatic area. The character inner space means an area inside the character edges or an area within the width of a character line. In general, the document recognition 320 includes a filter 321, an edge detection unit 322, a white area extraction unit 323, a dot pattern area extraction unit 324, a color determination unit 325 and a final determination unit 326. In the following exemplary units, it is assumed that the scanner 200 has the scanning density of 600 dpi.

Still referring to FIG. 4A, the filter unit 321 corrects the G color component image data from the scanner 200 in order to extract edges. Since the image data that is generated by the scanner 200 tends to be blurred due to some lens characteristics, an edge enhancement filter such as the filter unit 321 is applied. The filter unit 321 simply enhances the edges without enhancing stripe patterns widely for gradation expressions used in photocopiers. If the striped patterns are enhanced, graphics or picture portions using the striped pattern are extracted as edges. Due to the above undesirable enhancement, since there is a possibility that the character edges are mistakenly identified, the striped pattern should not be enhanced.

As shown in FIG. 8, a striped pattern (A) at 600 dpi and a striped pattern (B) at 400 dpi have a different periodic cycle. It is difficult to suppress the edge enhancement using a single filter characteristic. Thus, it is necessary to detect the period of an image pattern and to use an appropriate filter coefficient. A sum of the width of a white block and a black block in the main scanning x direction is a striped pitch in a predetermined number of pixels and can be expressed in a striped period. As the intensity level decreases, the width of the white block widens and that of the black block narrows. Contrarily, as the intensity level increases, the width of the white block narrows and that of the black block widens.

Referring back to FIG. 4A, the filter unit 321 has a filter of a pixel matrix size of 7 in the main scanning direction x and 5 in the sub scanning direction y in the scanner 200. There are two groups A and B of weight coefficients a1–a7, b1–b7, c1–c7, d1–d7 and e1–e7, each corresponds to a black in the filter 321. The coefficient group A suppress the enhancement of the striped pattern (A) at 600 dpi as shown in FIG. 8 while it enhances the character edges. Similarly, the coefficient group B suppress the enhancement of the striped pattern (B) at 400 dpi as shown in FIG. 8 while it enhances the character edges. The exemplary values of the coefficient groups A and B are provided below:

| Coefficient Group A | | | | | | |
|---|---|---|---|---|---|---|
| 0 | −1 | 0 | −2 | 0 | −1 | 0 |
| 0 | −1 | 0 | −2 | 0 | −1 | 0 |
| 0 | −1 | −1 | 20 | −1 | −1 | 0 |
| 0 | −1 | 0 | −2 | 0 | −1 | 0 |
| 0 | −1 | 0 | −2 | 0 | −1 | 0 |

The striped pattern A at 600 dpi, between the negative or relative small coefficients, 0 or a relatively large coefficient is distributed, and 20 or a substantially large coefficient is placed at the current pixel position for edge enhancement. By this arrangement of the coefficients, when the current pixel is located at an edge between the black and white areas in the striped pattern A, the sum of the products is substantially lower than that when the current pixel is at a character edge that is not the striped pattern A.

| Coefficient Group B | | | | | | |
|---|---|---|---|---|---|---|
| −1 | 0 | 0 | −2 | 0 | 0 | −1 |
| −1 | 0 | 0 | −2 | 0 | 0 | −1 |
| −1 | 0 | −1 | 20 | −1 | 0 | −1 |
| −1 | 0 | 0 | −2 | 0 | 0 | −1 |
| −1 | 0 | 0 | −2 | 0 | 0 | −1 |

The striped pattern B at 400 dpi, between the negative or relative small coefficients, 0 or a relatively large coefficient is distributed, and 20 or a substantially large coefficient is placed at the current pixel position for edge enhancement. By this arrangement of the coefficients, when the current pixel is located at an edge between the black and white areas in the striped pattern A, the sum of the products is substantially lower than that when the current pixel is at a character edge that is not the striped pattern B.

The horizontal direction is the main scanning direction x while the vertical direction is the subs scanning direction y. For example, a first of coefficients in the coefficient groups A and B correspond to a first of of row of coefficients a1–a7 in the filter 321 in FIG. 4A. The coefficient value 20 on a third row of the coefficient groups A and B is a coefficient c4 for a current pixel that is a center pixel of a third row c1–c7 of the coefficient matrix in the filter 321. The sum of products of a pixel value and the corresponding coefficient value is considered as a processed value for the current pixel c4 and is outputted to the edge extraction unit 322 and the white region extraction unit 323. The above described processed value is sequentially determined for the current pixel as the current pixel position is moved by one pixel at a time in the main scanning direction x and then in the sub scanning direction y.

To determine which group of the coefficients is used, the following two conditions are considered. When one of the two conditions is satisfied, the coefficient group B for the striped pattern B is used. Otherwise, the coefficient group A for the striped pattern A is used.

First Condition
(D[3][1]<D[3][2]) &
(D[3][7]<D[3][6]) &
(ABS (D[3][2]−D[3][4])>ABS (D[3][4]−D[3][1])) &
(ABS (D[3][6]−D[3][4])>ABS (D[3][4]−D[3][7]))

The above condition checks a low intensity or white area in the striped pattern (B) at 400 dpi as shown in FIG. 8.

Second Condition
(D[3][1]>D[3][2]) &
(D[3][7]>D[3][6]) &
(ABS(D[3][2]−D[3][4])>ABS(D[3][4]−D[3][1])) &
(ABS(D[3][6]−D[3][4])>ABS(D[3][4]−D[3][7]))

The above condition checks a high intensity or black area in the striped pattern (B) at 400 dpi as shown in FIG. 8. Where D[i][j] indicates a pixel value of the image data at x=i, y=j in the pixel matrix. For example, D[3][1] indicates a pixel value of a pixel that corresponds to coefficient a3 in the coefficient matrix. "&" is logical AND while "ABS" is an absolute value. The current pixel or the centrally located pixel is denoted by D[4][3].

When either of the two conditions is satisfied, since the image data that is read at 600 dpi is considered to be in the striped pattern (B) at 400 dpi, the edge enhancement is performed with the use of the coefficients in the coefficient group B. When neither of the two conditions is satisfied, the edge enhancement is performed with the use of the coefficients in the coefficient group A to avoid the enhancement of the striped pattern (A) at 600 dpi. In other words, the pitch of an image is detected, and the enhancement of the particular pitch of an image pattern is avoided while the character edge is enhanced. Although the above described edge enhancement uses the G image data, an alternative embodiment utilizes any image data that indicates the darkness/lightness level.

Still referring to FIG. 4A, the edge detection unit 322 detects character edges based upon the continuous intensity level in image data. In general, character areas have high intensity pixels or herein after black pixels and low intensity pixels or herein after white pixels. Near the character edges, these black or white pixels exist in a continuous manner. To find the continuity, the edge detection unit 322 further includes a tertiarization unit 322a to group the G pixel values into three groups based upon two threshold values TH1 and TH2, and the G image values have been filtered by the above described edge enhancement process. For example, the threshold value TH1 is 20 while TH2 is 80 when image data ranges from 0 to 255, 0 being white. The tertiarization unit 322a outputs a first signal for a white pixel if the input data is less than TH1 while it outputs a second signal for a black pixel if the input data is equal to or more than TH2. The tertiarization unit 322a outputs a third signal if the input data falls between the two threshold values.

A continuous black pixel detection unit 322b and a continuous white pixel detection unit 322c respectively detect black and white continuous portions based upon a comparison of the tertiarized image data values and a predetermined set of matching patterns. One example of the 3×3 matching patterns BPa–BPd and WPa–WPd is shown in FIG. 9. The black dots or circles in FIG. 9 indicate the above described black pixels while the white dots or circles indicate the above described white pixels. Any blank position that lacks the black or white dot is unspecified and can contain either black or white pixel as well as any intermediate valued pixel. The centrally located pixel in the 3×3 matrix is the current pixel. When the continuous black pixel detection unit 322$b$ detects a match with any of the black pixel distribution patterns Bpa–BPd, the continuous black pixel detection unit 322$b$ generates a signal indicative of the current signal being a black continuous pixel. When the continuous white pixel detection unit 322$c$ detects a match with any of the white pixel distribution patterns Wpa–WPd, the continuous white pixel detection unit 322$c$ generates a signal indicative of the current signal being a white continuous pixel.

Based upon the above described the black and white continuous pixel signals, a neighboring pixel detection unit 322$d$ determines whether or not a black or white continuous pixel exists near a current pixel in a 5×5 pixel block. This detection determines whether or not the current pixel is in an edge area or a non-edge area. When there is at least one black or white continuous pixel with in the 5×5 block, the block is considered as an edge block. Otherwise, the block is considered as a non-edge block. Furthermore, since the character edge areas exist in a continuous manner, an isolated point removing unit 322$e$ corrects any isolated edge areas as a non-edge areas. The isolated point removing unit 322$e$ generates an edge area signal with its value at 1 for the edge area and with its value at 0 for a non-edge area.

Still referring to FIG. 4A, the white area extraction unit 323 further includes a binarization unit 232$a$, a RGB white extraction unit 323$b$, a white background determination unit 323$c$, a black background determination unit 323$e$, a white pattern matching unit 323$d$, a black pattern matching unit 323$f$ and a white correction unit 323$g$. The binarization unit 232$a$ outputs its output data to the white determination unit 323$c$ by binarizing the G intensity image data from the filter unit 321 based upon a predetermined threshold value thwsb. The edge enhanced data in the preferred embodiment ranges from 0 to 255, 0 being white and the threshold value thwsb being 50. The binarization unit 232$a$ generates a binarized white signal at "1" when it determines as a binary white value if the edge-enhanced data is under the threshold thwsb value of 50. Contrarily, the binarization unit 232$a$ generates the binarized white signal at "0" when it determines as a binary black value if the edge-enhanced data is over the threshold thwsb value of 50.

Figure 10:
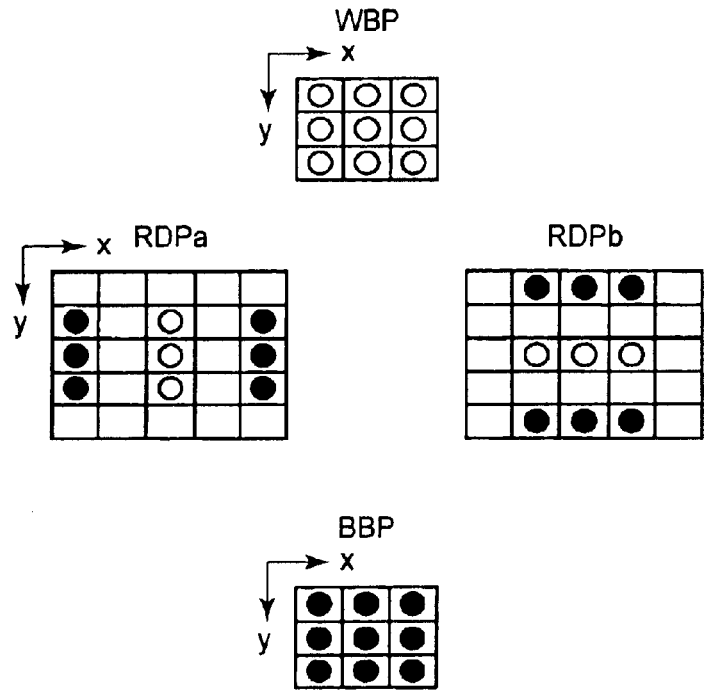
FIG. 10 illustrates an exemplary 3×3 pixel matrix WBP to be used for the white/black determination of the current pixel.

The RGB white extraction or detection unit 323$b$ determines whether or not image data is a white region or portion based upon the test results of 1) a RGB white background detection test, 2) a color background test and 3) white pixel valley test. The RGB white background detection test is performed by a RGB white background detection unit which is located within the RGB white extraction unit 323$b$. In general, the RGB white background detection unit activates a white background separation upon the detection of a white area in the RGB image data. For example, if a 3×3 pixel matrix WBP as shown in FIG. 10 has pixel values whose R, G and B values are all less than a predetermined threshold value thwss, a current pixel which is centrally located in the matrix, considered as a white area. The RGB white background detection unit generates a white background signal at "1." One example of the above detection is that each of the R, G, and B data in the preferred embodiment ranges from 0 to 255, 0 being white and the threshold value thwss being 40. The RGB white background detection unit generates a white background signal at "1" when it determines as a white background if the image data is under the threshold thwss value of 40. Contrarily, the RGB white background detection unit generates the white background signal at "0" when it determines as a non-white background if any one of the R, G and B image data is over the threshold thwss value of 40.

Figure 11:
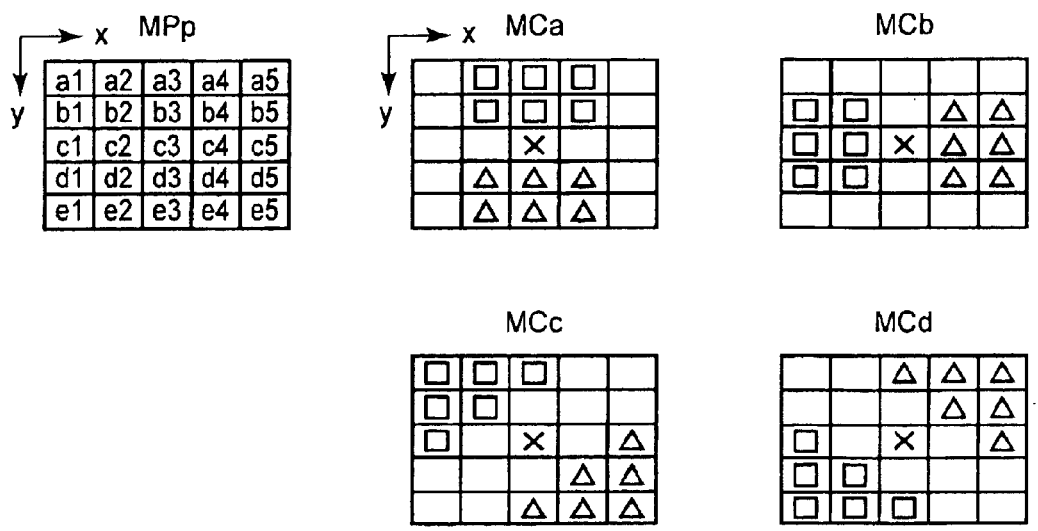
FIG. 11 illustrates an exemplary 5×5 pixel matrix to be used for the color background detection.

The color background detection unit generally determines a light color background as a non-white background so as to avoid an incorrect determination of light color background portions. To perform the above test, three elements of detection are first determined using a 5×5 pixel matrix, and each pixel is denoted as shown in FIG. 11. The current pixel is located at the center of the matrix, and it is indicated by an "x" in matrixes MCa, MCb, MCc and MCd.

A) First Element: If the difference between the max and minimal values for each of R, G and B image data exceeds a predetermined threshold value the, the color background detection unit generates a color pixel determination signal A at 1 which is indicative of a color pixel. On the other hand, if the difference between the max and minimal values for each of R, G and B image data fails to exceed a predetermined threshold value thc, the color background detection unit generates the color pixel determination signal A at 0 which is indicative of a white pixel.

B) Second Element: If all R, G or B values of every pixel in a predetermined group of pixels as indicated by a triangle, "Δ" in the matrixes MCa, MCb, MCc and MCd is below a predetermined threshold value thwc, the color background detection unit generates a first one-side determination signal B at 1 which is indicative of a white pixel. On the other hand, any R, G or B values of every pixel in a predetermined group of pixels as indicated by a triangle, "Δ" in the matrixes MCa, MCb, MCc and MCd exceeds a predetermined threshold value thwc, the color background detection unit generates the first one-side determination signal B at 0 which is indicative of a non-white pixel. For example, the threshold value thwc is 20.

C) Third Element: Similarly, if all R, G or B values of every pixel in a predetermined group of pixels as indicated by a triangle, "□" in the matrixes MCa, MCb, MCc and MCd is below a predetermined threshold value thwc, the color background detection unit generates a second one-side determination signal C at 1 which is indicative of a white pixel. On the other hand, any R, G or B values of every pixel in a predetermined group of pixels as indicated by a triangle, "□" in the matrixes MCa, MCb, MCc and MCd exceeds a predetermined threshold value thwc, the color background detection unit generates the second one-side determination signal C at 0 which is indicative of a non-white pixel.

D) Final Determination: Based upon the above described three elements A), B) and C), the following relation is examined:

$$A \text{ AND } (B \text{ XNOR } C) = 1$$

where AND is a logical AND and XNOR is a logical exclusive no OR. If the above equation is true, A is equal to 1 while B and C are both either white or non-white at the same time. The color background detection unit assigns a color background determination signal D at 1, whose value is later examined.

The reason for performing the elements A) through D) is that when white areas near dark or black characters become distorted in color by the RGB reading due to inaccurate placement of the document, these white areas should not be considered as a part of the color background. Around the black characters, the XNOR of the above signals B and C becomes 0 when one side of the current pixel is white pixel while the corresponding other side is non-white. Thus, the color background determination signal D also becomes 0. Furthermore, when the current pixel is a non-white pixel that is surrounded by white areas, the color background determination signal D becomes 1, which is indicative of color background. Even in areas with a high density of lines, a light colored pixel is detected as a color background. In other words, in prior art techniques, white areas cannot always be determined as white. Since the above element A) does not determine a pixel as a color pixel if the RGB difference is smaller, it is more strict than regarding a threshold thwc as intensity for a white background. For example, for thwss=40 and thwsb=50, thwc=20. The above elements B), C) and D) accurately determine whether or not the background is white so that a color pixel is accurately detected as a color background.

Finally, the white valley detection unit detects a white valley pixel in a small white area that cannot be detected by the above described RGB white background detection tests. Based upon the G image data in a 5×5 pixel matrix RDPa as shown in FIG. 10:

$$miny=min(G[1][2], G[1][3], G[1][4], G[5][2], G[5][3], G[5][4])$$

where G[1][2], G[1][3], G[1][4], G[5][2], G[5][3] and G[5][4] are indicated by black dots in the matrix RDPa. The function, min ( ) selects a minimal value. Similarly, based upon the G image data in a 5×5 pixel matrix RDPa, $$maxy=max(G[3][2], G[3][3], G[3][4])$$

where G[3][2], G[3][3] and G[3][4] are indicated by white dots in the matrix RDPa. The function, max ( ) selects a maximum value.

$$mint=min(G[2][1], G[3][1], G[4][1], G[2][5], G[3][5], G[4][5])$$

where G[2][1], G[3][1], G[4][1], G[2][5], G[3][5] and G[4][5] are indicated by black dots in the matrix RDPb.

$$maxt=max(G[2][3], G[3][3], G[4][3])$$

where G[2][3], G[3][3] and G[4][3] are indicated by white dots in the matrix RDPb.
Based upon the above determined values, $$OUT=((miny-maxy)>0)\#((mint-maxt)>0)$$

where # takes the larger of the two and assigns to OUT. In other words, the variable is assigned a number that is positive and is larger of the two. When OUT exceeds a predetermined threshold value, the current pixel of the matrix RDPa or RDPb is detected as a white valley pixel, and a white valley detection signal is generated as true or 1.

Figure 4B:
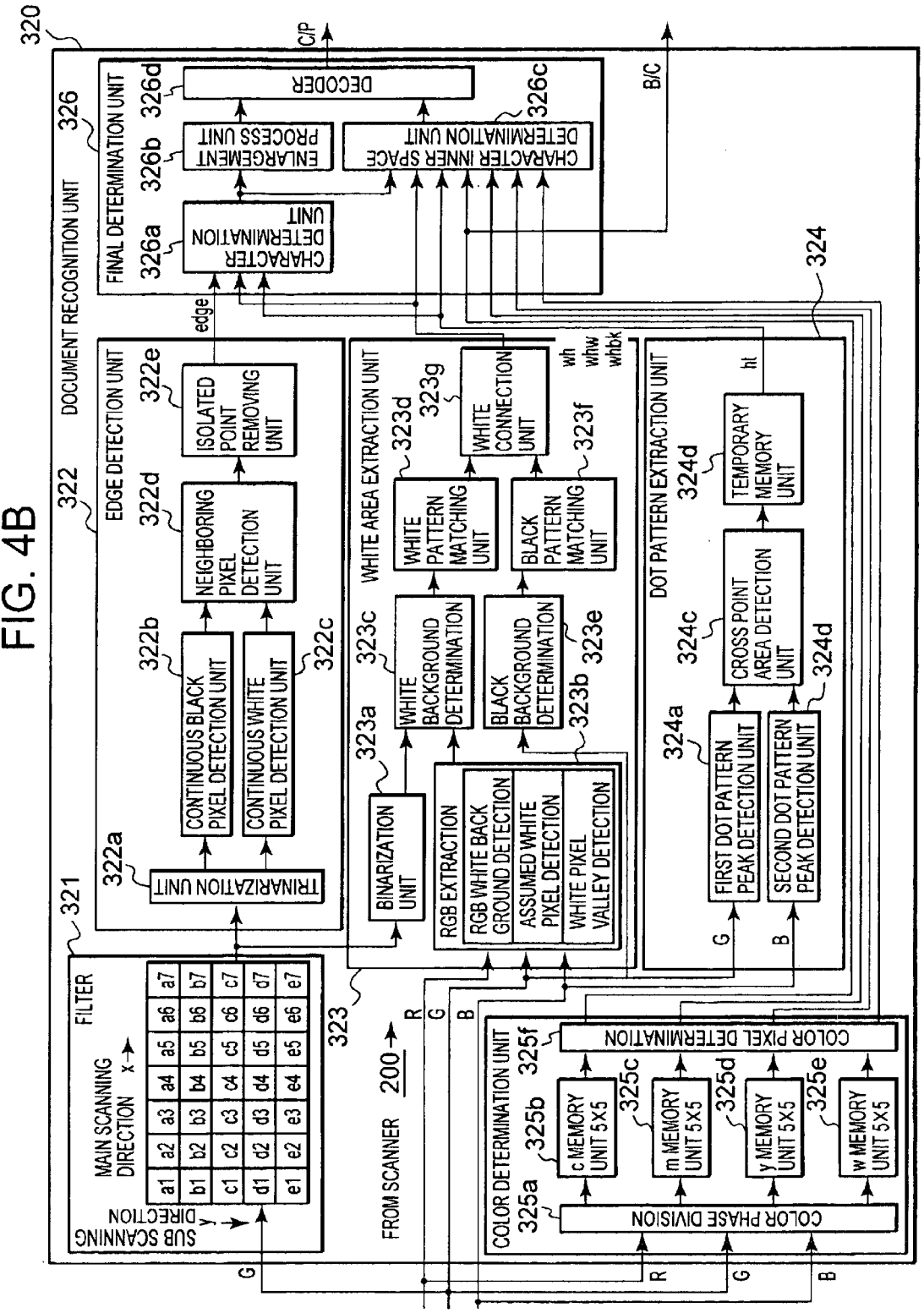
FIG. 4B is a block diagram illustrates a second preferred embodiment of the document recognition unit according to the current invention.

Now referring to FIG. 4B, a second preferred embodiment of the RGB white extraction or detection unit 323b according to the current invention. The second preferred embodiment includes substantially identical components of the first preferred embodiment as shown in FIG. 4A, and these common components are referenced by the same reference numerals as used in FIG. 4A. The second preferred embodiment includes a RGB white extraction or detection unit 323b' which performs 1) the RGB white background detection test, 2) an assumed white pixel detection test and 3) the white pixel valley test and determines whether or not image data is a white region or portion based upon the test results. In addition, since the RGB white background detection test and the white pixel valley test are substantially identical to the tests that have been described with respect to FIG. 4A, the descriptions of these tests are not reiterated here.

Still referring to FIG. 4B, the assumed white pixel detection test avoids the undesirable determination of yellow color background as a white background by defining assumed white pixels. If any B image data is under a predetermined threshold thwc and exists in a 5×5 pixel matrix with the centrally located current pixel, the current pixel is labeled as an assumed white pixel. Since only the B image data is used in the assumed white pixel detection test, the yellow color Y is detected in the assumed white pixel detection test. On the other hand, since the white determination unit 323c relies only upon the G image data, the white determination unit 323c cannot detect the yellow color Y.

Figure 5A:
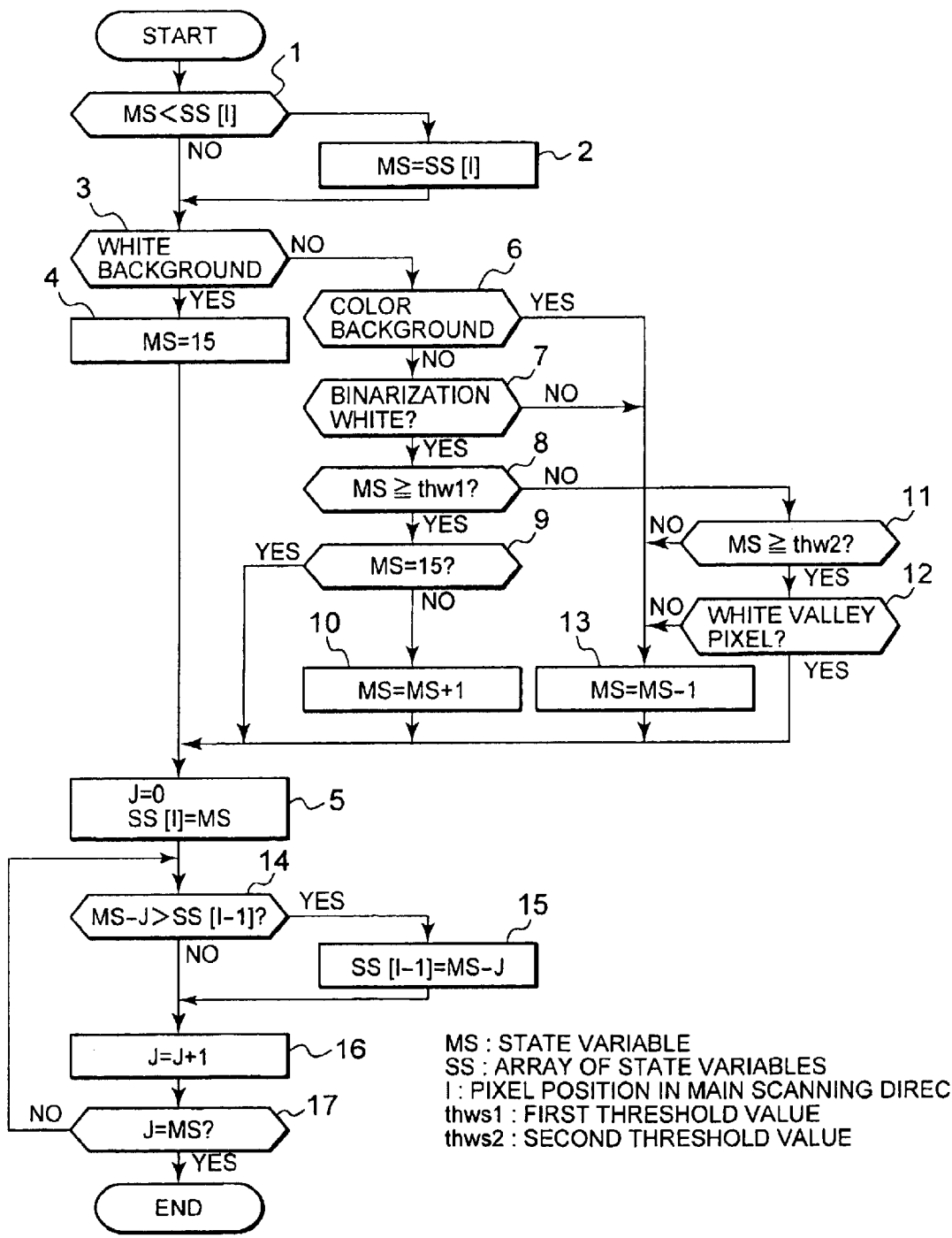
FIG. 5A is a flow chart illustrating steps involved in a first preferred process that runs in the white background determination unit according to the current invention.
Figure 12:
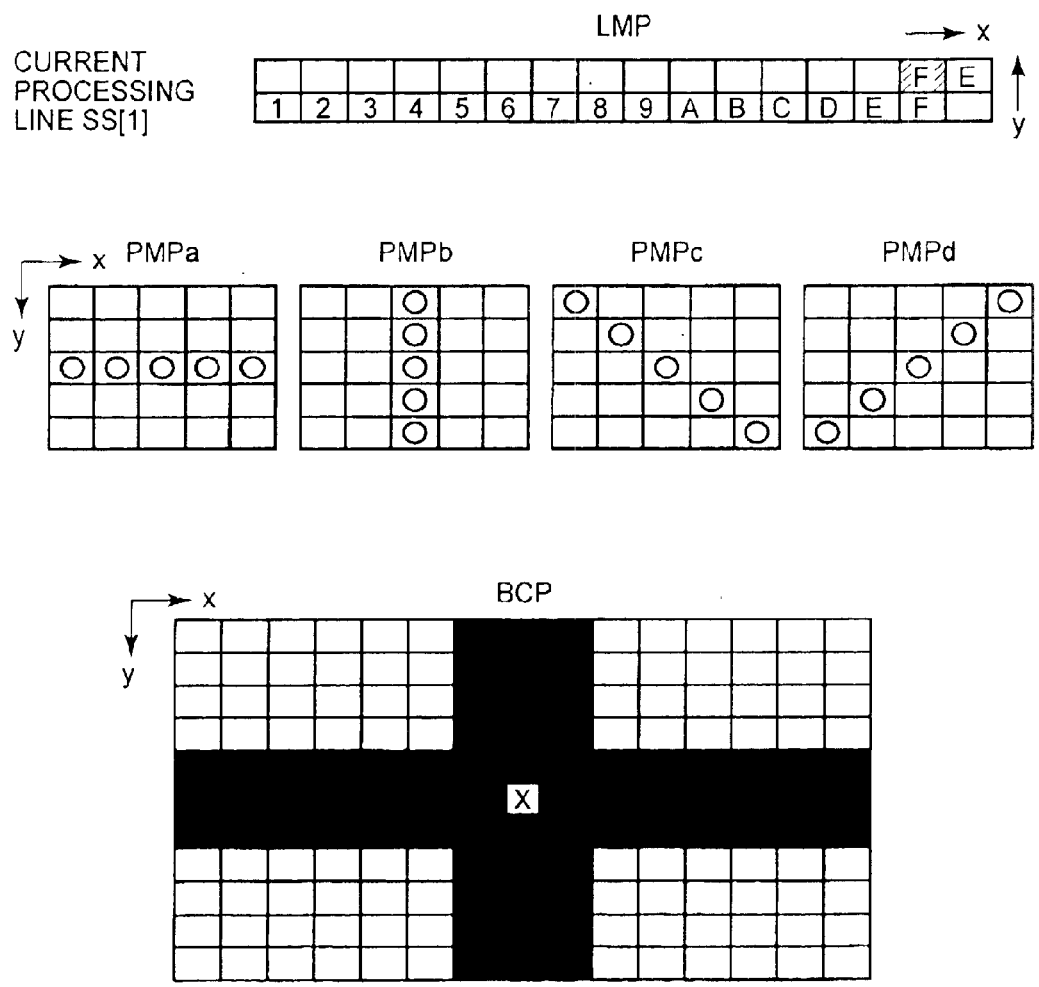
FIG. 12 illustrates a line memory to be used for the white information spreading process.

A white determination unit or white background determination unit 323c updates state variables MS and SS[I] are four-bit information to indicate white level, white level information or white background information. The state variable MS is a current line or row of pixels that is currently being processed while SS[I] is a line that is one line before MS that has been already processed. The white background determination unit 323c processes the information in a first preferred process involving steps as illustrated in FIG. 5A. Prior to the preferred process upon the activation of the image duplicating process, the both variables MS and SS[I] range from 0 to 15 and are initialized to a value, 0. The value, 15 indicates the highest degree of whiteness the value, 0 indicates the lowest degree of whiteness. In step 1, the state variables MS and SS[I] are compared, if the variable SS[I] is larger, the value of the previous line SS[I] is assigned to the current line state variable MS in step 2. Otherwise, the value of MS of the previous pixel is assumed for the MS value of the current pixel. This means that the most white information of the surrounding pixels is selected for the current pixel. In step 3, it is determined whether or not the white background signal from the above described RGB white background detection unit or test is "1." If that is true, in step 4, the variable MS for the current pixel is set to 15 while the previous line SS[I] is also set to 15 as MS=15 in step 5. A counter J is initialized to 0 in the step 5. At this point, the white information MS is written onto a current line of a line memory LMP as shown in FIG. 12 in the main scanning direction F of the current pixel. Similarly, the white information SS[I] is written onto a previous line of the line memory LMP in the main scanning direction F of the current pixel.

Still referring to FIG. 5A, in steps 14 through 17, the previous line white information SS[I] is transferred to the pixel in the previous line in the following manner. The index, [I] indicates the scanning position of the current pixel while [I−1] indicates the position of a pixel that is located one pixel before the current pixel in the scanning direction. In step 14, it is determined whether or not MS−J>SS[I−1] is true. If it is true, in step 15, SS[I−1] is assigned MS−J. That is, when J is 1 for the second iteration, if the white information value of SS[I]−1 or (MS−1) is larger than SS[I−1], SS[I−1] is assigned the value of SS[I]−1 or (MS−1) which is one less than the value of SS[I] or MS. Similarly, when J is 2, if SS[I−2]<SS[I]−2 is true, SS [I−2]=SS[I]−2 in the steps 16, 17, 14 and 15. When J is 3, if SS[I−3]<SS[I]−3 is true, SS [I−3]=SS[I]−3 in the steps 16, 17, 14 and 15. Lastly, when J is 15, if SS[I−15]<SS[I]−15 is true, SS [I−15]=SS[I]−15 in the steps 16, 17, 14 and 15. The minimal value of the white information SS[I] is 0 and should not exceed 0. Thus, thanks to the above described steps 14–17, the white information of the previous line SS updates the current pixel white information to a value that is one less for each one pixel position inaccuracy in the main scanning direction x, and the current pixel white information spreads at the same reduction rate. This is also referred to as white spread processing. However, this is limited to a situation where the previous line white information value is smaller than the current line. For example, if the previous line is detected as a white region by the RGB white background detection test and the previous line white information is assigned the value of 15, since the value 15 is the highest, the above white spread processing does not take place.

Still referring to FIG. 5A, if the white background signal is 0 in the step 3, it is determined in step 6 whether or not the color background determination signal D from the above described color background determination detection test or unit 323b is true or 1. If it is true, the preferred process proceeds to step 13 where MS is decremented by one. On the other hand, the color background determination signal D is false or 0, the preferred process proceeds to a step 7 where it is determined whether or not the binarized white signal from the binarization test or unit 323a is true or 1. If the binarized white signal is true and MS is equal to or larger than a first predetermined threshold value thw1 in step 8 but is not equal to a value 15 in step 9, the preferred process proceeds to step 10 where MS is incremented by one. If MS is equal to 15, the preferred process proceeds to the step 5 without updating MS. If MS is not equal to or larger than a first predetermined threshold value thw1 in step 8, the preferred process compares MS to a second predetermined threshold value thw2 in step 11. If MS is equal to or larger than a second predetermined threshold value thw2 in step 11, it is determined whether or not the white valley detection signal from the above described white valley detection test or unit 323b is true in step 12. If the white valley detection signal is true, the preferred process proceeds to the step 5 without updating MS. On the other hand, if the white valley detection signal is false, the preferred process proceeds to step 13 where MS is decremented by one. When the preferred process proceeds to the step 5, the following steps 14 through 17 are also performed.

As described above, the preferred process generates the white information MS. During the generation of MS, the white information is spread to the adjacent pixel on line memory. In general, the white information MS is generated in a first path including the steps 3, 4, 5 and 14–17 for a color corresponding MS based upon the RGB white background signal indicating white background when the R, G and B image data are less than the predetermined threshold thwss= 40. Alternatively, the white information MS is generated in a second path including the steps 3, 6–13 and 14–17 for a intensity corresponding MS based upon the binarization white signal and the G image data when the G image data is less than the predetermined threshold thwsb=50. The above described first path is not activated unless the RGB white background determination signal is true. This is because it is designed to prevent a mischaracterization of an area that has not been determined as a white area based upon the white pattern matching of the G image data that has been edge-enhanced by the filter unit 321.

When characters on light color background are edge-enhanced by the edge enhancing filter 321, image data representing the areas around the characters become to have lower values to represent lighter or white than the original background color. Thus, when the edge-enhanced data undergo white matching patterns, if the above described second path in FIG. 5A is the only way for the MS white information generation in the steps 7–13, 5 and 14–17, it is likely that the areas around the characters on a color background are mistakenly considered as white. The above described second path for the MS white information generation in the steps 3, 4, 5 and 14–17 prevents the mistake for determining the edge-enhanced data as a white region by assigning the white information MS value to be the highest value that is indicative of the need for later white pattern matching as well as by undergoing additional checks when the background is not white. The additional checks involves the steps 6–12 to adjust the MS value which is one factor in applying the white pattern matching. For example, when it is highly likely that a pixel is a color pixel, the value in the white information MS is decrement in the step 13. On the other hand, if it is doubtful that a pixel is a color pixel, the value in the white information MS is unchanged as shown in the Yes options in the steps 11 and 12 so as to avoid an inaccurate result in the white pattern matching process and to ultimately avoid the inaccurate determination of the areas around the character being white due to the area having a value that is lower than the original background value.

Areas having a high density of lines are also correctly detected. Since the above described second path updates the MS white information and spreads the MS white information in the steps 3, 4, 5, 6–10 and 14–17, the second path substantially reduces a possibility for mistakenly determining character areas having dense lines as graphical image portions. One example of the above high density character is a certain group of Chinese characters such as one for "write" that have a predetermined number of horizontal and vertical lines which cross with each other at more than several points. A certain inner portions of the high-density characters may not be recognized as a white area by the above described RGB white background detection test due to the high density of lines. In these situations, the above described white valley pixel detection test determines these inner portions as white, and the value of the white information MS is unchanged as seen in the Yes option of the step 12 in FIG. 5A. Because the white information value is unchanged in the above situation before the preferred process proceeds to the step 5, the likelihood for the inner space of the high-density character to be mistakenly recognized as a picture portion is substantially reduced.

As described above, when the current pixel is a color pixel that is surrounded by white background, the color background detection signal D becomes 1 to indicate that the current pixel is a color pixel even if the current pixel is a light color and a subject area contains a large number of lines. The threshold value thwc determines whether or not surrounding areas are white. Since the threshold value thwc is set to a relatively low value of 20, the surrounding areas of a light color current pixel are strictly examined so that even a light color current pixel is detected as a color pixel. Thus, the likelihood for mistaking the inner space of a high density character as a graphical portion is substantially reduced. Upon correctly detecting a light color pixel as a color background, the white level information MS is decremented by one to reduce a possibility for determining the current pixel as white via the steps 6 through 13 in FIG. 5A. In addition, for example, a predetermined threshold value thwss is set to 40 for generating a white background determination signal referred in the step 3 while a predetermined threshold value thwsb is set to a larger value of 50 for generating a binarization determination signal referred in the step 7. After the step 6 determines that the current pixel is not a color background pixel, the possibility is thus increased to determine the current pixel as a white pixel based upon the binarization white detection test in the step 7 and to ultimately determine the current pixel as a white area based upon the increased value in the state variable MS through the steps 7 through 10 in FIG. 5A.

That is, the threshold thwss at 40 enables a strict white determination in the RGB white background detection, and upon the white determination, by the steps 3 and 4, the state variable MS value is incremented to increase a possibility to determine the character background as white. Upon failing to conclude the white determination via the above strict white background determination, the result from the above described strict color background determination is referred. When the color background determination result is not color background, once again it is determined as to whether or not the current pixel is white based upon the binarization white determination based upon the threshold thwsb at 50, which allows a relatively easy white determination outcome through the steps 7 through 9. In the step 10, the MS value is incremented by one to increase the possibility that the character background is determined as white. Because of the above described steps 6 through 10, the MS value is suppressed to oscillate in a substantial manner in response to fine unevenness due to characters in an input document when there exists certain background intensity unevenness that is lighter than a light color pixel to be detected as a color background. For example, the unevenness is described as the background when the text document is seen through from the back. In the white pattern matching, the white pixel determination is also controlled to suppress the fine fluctuations in the main scanning direction. As a result, when the background is light color background, fine white spots or backgrounds do not appear in response to the unevenness as seen from the back of the text document.

Figure 5B:
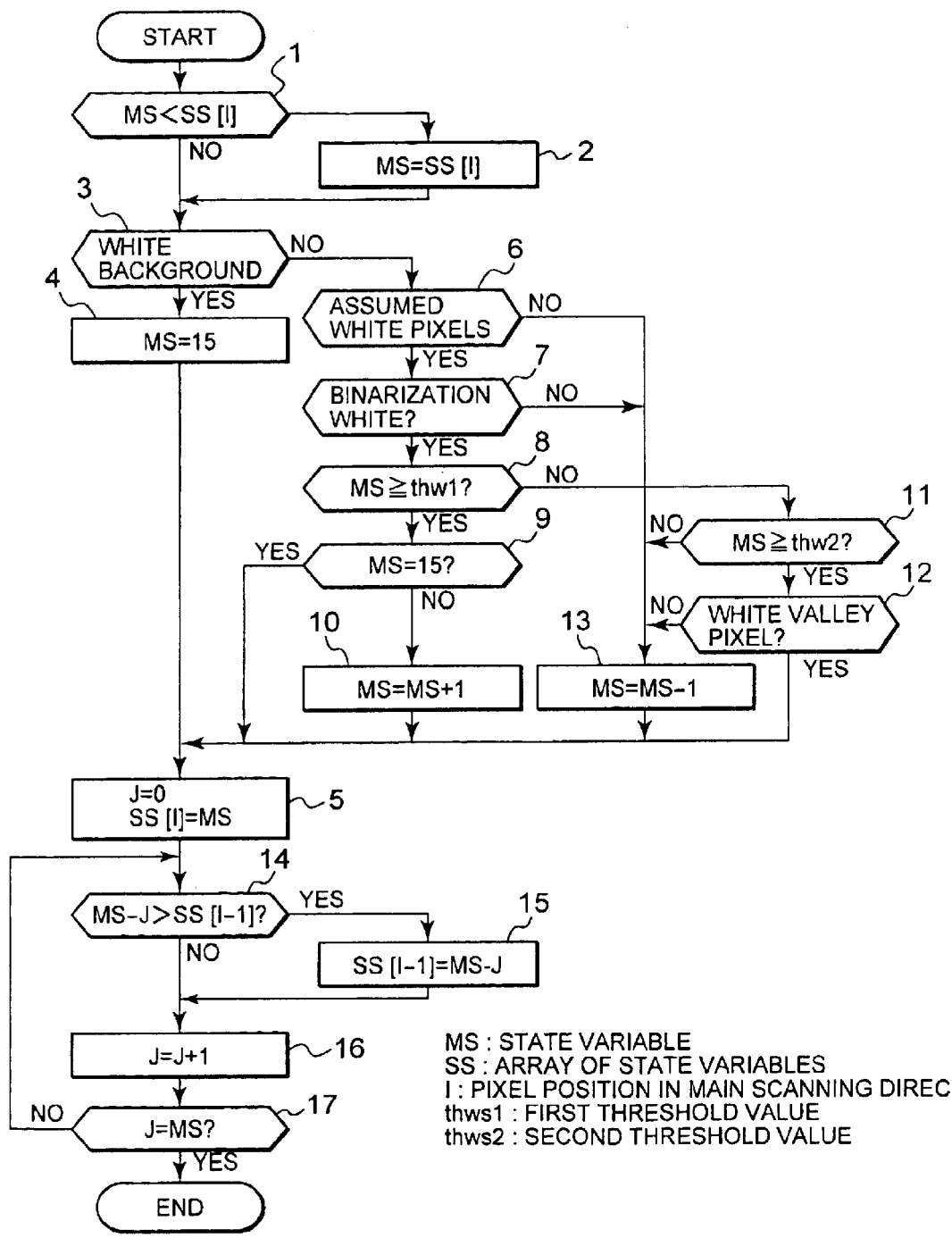
FIG. 5B is a flow chart illustrating steps involved in a second preferred process that runs in the white background determination unit according to the current invention.

Now referring to FIG. 5B, a flow chart illustrates steps involved in a second preferred process that runs in the white background determination unit according to the current invention. The second preferred process involves the substantially identical steps as described with respect to the first preferred process as illustrated in FIG. 5A except for step 6 which involves the assumed white pixel test. The substantially identical steps in the preferred process are referenced by the same reference numerals used in the first preferred process, and the corresponding descriptions are not reiterated here.

Still referring to FIG. 5B, if the step 3 concludes that the current pixel is not a part of the white background, the preferred second process proceeds to step 6 where the above described assumed white pixel test is performed. When the test result of the assumed white pixel test is affirmative in the step 6, the output from the binarization unit 323a is white in step 7, the white information MS value is equal to or larger than a predetermined threshold value thw1 in step 8, the MS value is not 15 in step 9, the MS value is incremented by one in step 10. One exemplary value of the threshold thw1 is 13. When the MS value is already 15 in the step 9, the MS value is maintained as its maximal value 15, and preferred second process proceeds to the step 5 for performing the white spread steps 14 through 17. When the test result of the assumed white pixel test is negative in the step 6 and the output from the binarization unit 323a is white in the step 7 but, the white information MS value is not equal to or larger than the predetermined threshold value thw1 in the step 8, the MS value is compared against a second threshold value thw2 in step 11. If the MS value is equal to or larger than the threshold value thw2 and the current pixel is a white valley pixel in step 12, the second preferred process proceeds to the steps 5 and 14 through 17. On the other hand, if any one of the steps 7, 8, 11 and 12 yields a negative result, the second preferred process proceeds to step 13, where the white information MS value is decremented by one. If the MS value is already 0, the MS value is maintained as its minimal value 0, the second preferred process proceeds to the step 5 for performing the white spread steps 14 through 17.

Referring back to FIG. 4A, the white pattern matching unit 323d determines whether or not the background is white based upon a presence of continuous white pixels in a 5×5 pixel block with a centrally located current pixel. When the following equations are satisfied, the current pixel is assumed as a white pixel and a white pattern matching is performed.

(non-color pixel & (white background information MS≧thw1 (13)) & binarization white)

(non-color pixel & (white background information MS≧thw2 (1)) & valley white pixel & binarization white)

Alternatively, referring back to FIG. 4B, the white pattern matching unit 323d determines whether or not the background is white based upon a presence of continuous white pixels in a 5×5 pixel block with a centrally located current pixel. When the following second set of the equations is satisfied, the current pixel is assumed as a white pixel and a white pattern matching is performed.

(assumed white pixel & (white background information MS≧thw1 (13)) & binarization white)

(assumed white pixel & (white background information MS≧thw2 (1)) & valley white pixel & binarization white)

Furthermore, when the following third set of the equations is satisfied, the current pixel is assumed as a white pixel and a white pattern matching is performed.

(assumed white pixel & (white background information MS≧thw1 (13)))

(assumed white pixel & (white background information MS≧1) & valley white pixel)

The current pixel that has been processed in the steps 5, 14 through 17 for the white spread process is considered for the above equation. The white background information MS in the above equation is the current pixel or the white background information MS[I] that has been already processed in the steps 14 through 17 for the white spreading process. The index, I indicates a position in the main scanning direction x of the current pixel to be used in the above equation and is different from the current pixel position in the main scanning direction x to determine the state variable MS in the white determination unit 323c.

The non-color pixel in the above equation means that the color background determination signal D is 0, the binarization white determination signal is 1, and the valley white pixel is found. # is logical OR. The white pattern matching compares the output from the above equation to every one of continuous patterns PMPa through PMPd in FIG. 12 to find a match. White circles in the patterns PMPa through PMPd indicate white pixels. Other pixels without the white circles are not necessarily specified as white pixels.

The current pixel is determined as a white pattern pixel when the distribution of the white pixels in a 5×5 pixel matrix with the centrally located current pixel matches one of the white pixel distributions PMPa, PMPb, PMPc and PMPd as shown in FIG. 12. The result of the white pattern matching is placed in a 4×4 pixel block. As a result of the white pattern matching, if at least one white pattern pixel exists in the 4×4 pixel block, the 4×4 pixel block becomes the white block by making every pixel a white pixel.

A pixel is determined as a black pixel when the G image data of the pixel exceeds a predetermined threshold value thbk. On the other hand, a pixel is determined as a white pixel when the G image data of the pixel fails to exceed a predetermined threshold value thbk. Based upon the above results of the black/white pixel determination in the black determination unit 323e, a black pattern matching process is performed. If every pixel is black in a 3×3 pixel matrix with a centrally located current pixel as shown in a black pattern BBP in FIG. 10, the current pixel is considered as a black pixel. The result of the black pattern matching is placed in a 4×4 pixel block. As a result of the black pattern matching, if at least one black pattern pixel exists in the 4×4 pixel block, the 4×4 pixel block becomes the black block by making every pixel a black pixel.

Referring back to FIG. 4, the white correction unit 323g extracts white areas based upon the following white block correction, black block correction and white area determination. FIG. 12 shows one block pattern BCP, and one block is a 4×4 pixel block. The white correction provides white block correction data to a current block when at least one white block candidate exists in every one of the four 6×4 blocks in the corners in a block pattern BCP with a centrally located pixel as marked by x. By this correction, the area surrounded by white background is a white area. The black correction provides black block correction data to a current block when at least one white block exists in a 3×3 block with a centrally located current block and at least one black block exists in a 5×5 block matrix with the centrally located current block. By this correction, the boarder area between a white block and a black block is a white area.

Figure 13:
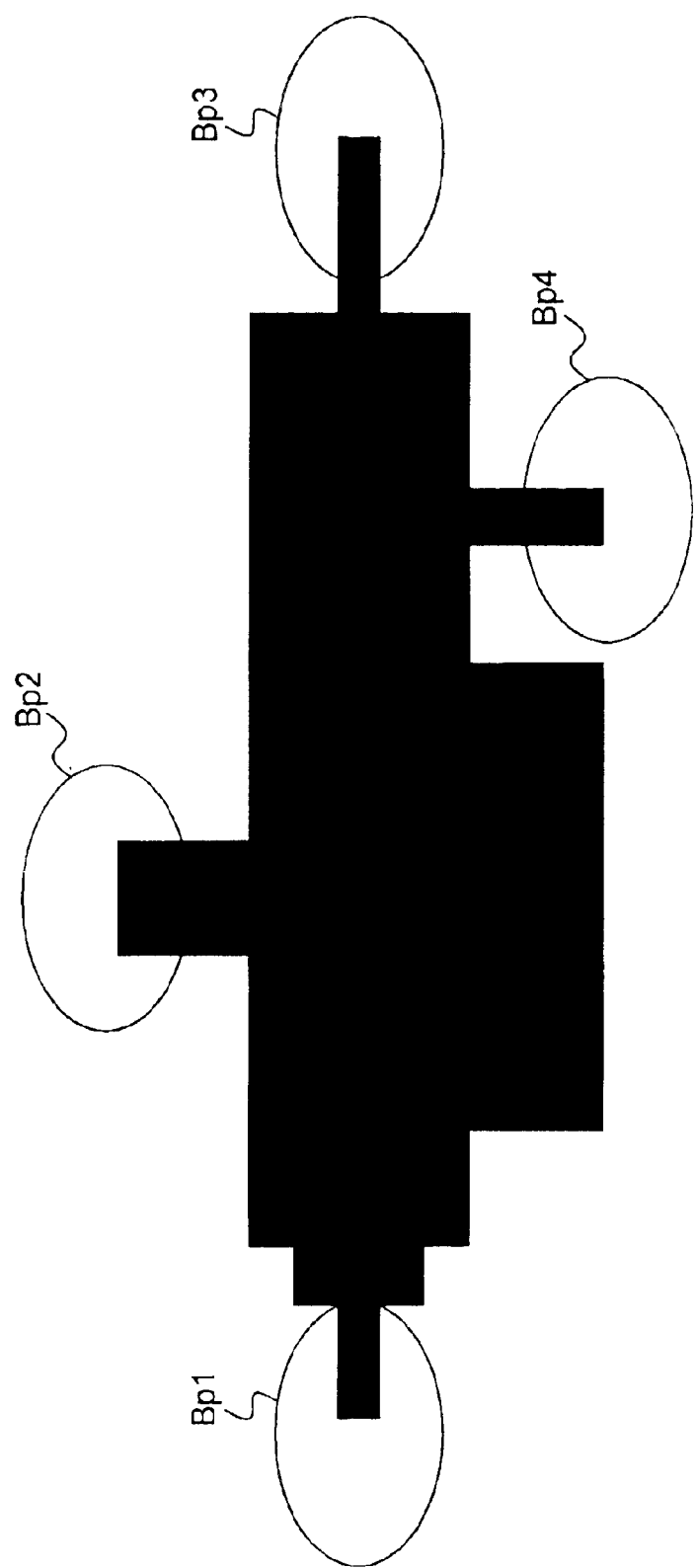
FIG. 13 is a diagram illustrating black projected portions to be replaced by white blocks by the white block correction.

The white area determination determines a white area if the black block correction data or the white block correction data exists. As shown in FIG. 13, black projected portions Bp1 through Bp4 as indicated by circles are replaced by white blocks by the white block correction when at least one white block candidate exists in every one of the four 6×4 blocks in the corners in a block pattern BCP. By converting the black projected portions Bp1 through Bp4 as indicated by circles that are surrounded by white areas into white areas, the possibility for determining those areas as graphical areas is substantially reduced. A final determination unit 326 as will be described determines non-white areas as graphical areas. However, the final determination unit 326 reduces a undesirable possibility of determining the black projected portions Bp1 through Bp4 as indicated by circles that are surrounded by white areas to be graphical areas. Since based upon the block correction and the white area determination, the boarder areas between the black background and the white background is determined as white areas or character areas, the character edges are determined as white areas regardless of the character thickness. Ultimately, it is possible to correctly determine the character edges as character edges.

The white area extraction unit 323 includes the white background detection unit 323c which generates the white background information MS which indicates a state variable for a degree of whiteness in accordance with the white valley signal, the white background detection signal from the RGB white extraction unit 323b and the binarization white determination signal from the binarization unit 323a. The white pattern matching unit 323d temporarily determines whether or not the current pixel is a white pixel based upon the color background determination signal D, the white background information MS, the binarization white determination signal and the valley white pixel determination signal. Later, based upon the white pixel distribution pattern matching of a pixel matrix including the current pixel, it is concluded whether or not the current pixel is a character portion. With the use of the above conclusion and the results from the black background determination unit 323e and the white pixel distribution pattern matching unit 323f, the white correction unit 323g determines whether or not the current pixel is on a boarder between the black background and the white background. The boarder is a white area or a character area.

The white background determination signal from the RGB white extraction unit 323b is one or ON if the R, G and B data of the current pixel are all under the threshold value thwss=40. The larger the threshold value thwss is, the higher the possibility is for the white background information MS to have a large value. Thus, the possibility increases to extract the above white area or a character area that is a boarder between the black background and the white background. In other words, the possibility to extract a graphical area is reduced. On the other hand, if the thwss is made smaller, the opposite possibilities occur.

The binarization white determination signal from the binarization unit 323a is referred in the step 7 of FIG. 5A and is one or ON when the edge-enhanced G image data from the filter unit 321 is smaller than the predetermined threshold thwsb=50. The larger the threshold value thwsb is, the higher the possibility is for the white background information MS to have a large value. Thus, the possibility increases to extract the above white area or a character area that is a boarder between the black background and the white background. In other words, the possibility to extract a graphical area is reduced. On the other hand, if the thwsb is made smaller, the opposite possibilities occur.

Since the white area of the image data is later processed to have a clear character image, if the thresholds thwss and thwsb have a larger value, the image process has a higher priority for the character image data. Non-white areas or graphical areas are later processed to have a clear graphical image, if the thresholds thwss and thwsb have a smaller value, the image process has a higher priority for the graphical image data.

Incidentally, if the color background determination signal from the RGB white extraction unit 323b is one or ON, the white background information MS has a lower value, the possibility decreases to extract the above described white area. That is, the possibility increases to extract the graphical areas. If a threshold thwc used to generate the color background determination signal is made to have a relatively small value such as 20, the possibility increases to simultaneously detect the surrounding pixels as dented by "Δ" and "□" in FIG. 11 as color pixels (i.e, B XNOR C=1). Consequently, the possibility increases to detect the color background determination signal being one while the possibility also decreases to detect the above described white areas. In other words, the possibility to extract a graphical area is increased.

The threshold values thwss, thwsb and thwc are user defined and adjusted by an operator. Via the operation/display unit OPB, an operator selects a set of parameters for the above threshold values by specifying a character/photographic mode. The operator can select a desirable parameter set by pushing an up or down key or a parameter specifying key in the menu displayed in the display unit.

| | character adjustment values | | | standard | photographic adjustment values | | |
|---|---|---|---|---|---|---|---|
| parameters | 6 | 5 | 4 | 3 | 2 | 1 | 0 |
| thwss | 46 | 44 | 42 | 40 | 38 | 36 | 34 |
| thwsb | 56 | 54 | 52 | 50 | 48 | 46 | 44 |
| thwc | 26 | 24 | 22 | 20 | 18 | 16 | 14 |

The default value for the character/photographic level parameter is 3. The conversion table for specifying the relationship between threshold values thwss, thwsb and thwc and the above character/photographic level is stored in the ROM 358 as shown in FIG. 3. When the IPU 300 is turned on and the CPU 357 initializes the IPU 300, the CPU reads the default value for the character/photographic level as well as the corresponding default threshold values thwss, thwsb and thwc from the conversion table in the ROM 358 and writes them in the corresponding registers in the RAM 356 for the above described processes for the white area extraction unit 323. Later, if an input via the operator board OPB adjusts the character/photographic level, an adjusted value A is given to the CPU 357 from the main controller 10 and the CPU 357 reads threshold values thwss, thwsb and thwc that correspond to the adjusted value A from the conversion table in the ROM 358 and writes them in the corresponding registers in the RAM 356.

If threshold values thwss, thwsb and thwc have been respectively set at 40, 50 and 20 and the operator changes the character/photographic level i by one using an up arrow key, the threshold values thwss, thwsb and thwc are adjusted by 2i or 2 towards the character-friendly processing. Contrarily, if the operator changes the character/photographic level i by one using an down arrow key, the threshold values thwss, thwsb and thwc are adjusted by 2i or 2 towards the photographic-friendly processing.

Referring back to FIG. 4A, a first dot pattern peak detection unit 324a is a circuit to detect a pixel that is a part of the dot pattern or a dot pattern peak pixel based upon the pixel intensity information of the G image data that has a predetermined range. When the two following conditions are simultaneously satisfied, the dot pattern peak pixel is detected:

First Condition: The intensity level of a centrally located pixel has either a maximal value (a top peak) or a minimal value (a valley peak) within the predetermined range of values.

Second Condition: An absolute value of the difference in pixel intensity value between the centrally located pixel and an average pixel intensity value of every pair of pixels that is symmetrical about the centrally located pixel exceeds a predetermined threshold value Th.

Referring to FIG. 14, a 5×5 pixel matrix mask is used as a local area for masking in this example. However, in general, the pixel matrix is not limited to 5×5 and is expressed as M×M. Using the position index as used in the pattern MPp in FIG. 11 for each pixel in the 5×5 matrix mask, the centrally located current pixel is indexed by c3. The intensity of the current pixel c3 is denoted by Lc while that of the surrounding pixels is respectively denoted by L1 through L8. If all of the following conditions are satisfied, the central pixel Lc is detected as the dot pattern peak pixel:

$Lc = \min(L1, L2, L3, L4, L4, L5, L6, L7, L8)$

OR $Lc = \max(L1, L2, L3, L4, L4, L5, L6, L7, L8)$ $abs(2Lc-L1-L8) \geq Lth$ AND $abs(2Lc-L2-L7) \geq Lth$ AND $abs(2Lc-L3-L6) \geq Lth$ AND $abs(2Lc-L4-L5) \geq Lth$ where Lth is a predetermined threshold value. The examples of the above surrounding pixels L1 through L8 are shown in the surrounding pixel distribution matrixes MPa and MPb in FIG. 14. The surrounding pixels L1 through L8 in the matrixes MPa and MPb are indicated by "□" When the dot pattern peak pixel is detected using the matrixes MPa or MPb, a signal is generated to indicate the detection of the dot pattern peak pixel, and the signal is given to the centrally located current pixel c3. The use of the two matrixes allows to respond to the number of dot patterns.

The surrounding pixel distribution matrixes MPa is:
L1=b2, L2=b3, L3=b4,
L4=c2, L5=c4, L6=d2,
L7=d3, L2=d4
where L1=b2 means that the intensity value of the pixel b2 is assigned to L1 which is used in the determination of the above described dot pattern peak pixel.

The surrounding pixel distribution matrixes MPb is:
L1=b2, L2=a3, L3=b4,
L1=c1, L2=c5, L3=d2,
L1=e3, L2=d4

In reproduction of an image, the size reduction and enlargement in the sub scanning direction y is based upon the document scanning speed of the scanner 200, and the scanner 200 outputs the enlarged or reduced image data in the sub scanning direction y. In case of the size reduction, surrounding pixel distribution matrixes MPc and MPd are used in lieu of MPa and MPb. Similarly, in case of the size enlargement, surrounding pixel distribution matrixes MPe and MPf are used in lieu of MPa and MPb. The pixels indicated by "Δ" in the surrounding pixel distribution matrixes MPe and MPf may be included in the above defined surrounding pixels.

Referring back to FIG. 4A, a second dot pattern peak detection unit 324b is essentially the same as the first dot pattern peak detection unit 324a except that it detects a second dot pattern peak using the B image data in lieu of the G image data. Since the first dot pattern peak detection unit 324a uses the G image data, the first dot pattern peak detection unit 324a responds to almost all colors except for yellow. For this reason, the second dot pattern peak detection unit 324b uses the B image data to supplement the detection of a Y dot pattern peak. A dot pattern area detection unit 324c totals in a predetermined small size area a number of peaks and valley pixels that have been determined by the first dot pattern peak detection unit 324a and the second dot pattern peak detection unit 324b and assigned the total number as a total number P. The dot pattern area detection unit 324c compares the total number P to a predetermined threshold Pt. If the total number P exceeds the predetermined threshold Pt, the dot pattern area detection unit 324c determines all of the pixels in the predetermined small size area as the dot pattern area. In case of the pixel as a unit of processing, the dot pattern area detection unit 324c determines the centrally located pixel as the dot pattern pixel. The determination result is stored in a temporary memory unit 324d.

Based upon the dot pattern/non dot pattern results of the neighboring areas, the threshold value Pth is accordingly adjusted for the current area. For the preferred embodiment, the threshold value Pth includes two predetermined values TH1 and TH2, and TH1>TH2. Based upon the dot pattern/ non dot pattern results of the neighboring areas stored in the temporary memory unit 324d, either of TH1 and TH2 is selected. The selection is that if the dot pattern/non dot pattern results of the neighboring areas are non-dot patterns, since the areas are likely to be line image, to reduce wrong detections, the threshold PTh is set to a restrictive value of TH1. On the other hand, that if the dot pattern/non dot pattern results of the neighboring areas are dot patterns, since the areas are likely to be dot pattern image, to reduce wrong detections, the threshold PTh is set to a less restrictive value of TH2. Incidentally, the threshold PTh is initialized to TH1.

Referring to FIG. 14, a diagram AMP illustrates the distribution of the above described predetermined small size areas S1 through S4, each of which is a 4×4 pixel block. The block S4 is a current block while the blocks S1, S2 and S3 are neighboring blocks that have been already processed. When all of the blocks S1, S2 and S3 have been detected as a dot pattern block, the value TH2 is selected as the threshold PTh for the current block S4. On the other hand, when any of the blocks S1, S2 and S3 has been detected as a non-dot pattern block, the value TH1 is selected as the threshold PTh for the current block S4. The above selection criteria are merely exemplary. Alternatively, when any of the blocks S1, S2 and S3 has been detected as a dot pattern block, the value TH2 is selected as the threshold PTh for the current block S4. Similarly, when all of the blocks S1, S2 and S3 have been detected as a non-dot pattern block, the value TH1 is selected as the threshold PTh for the current block S4. Furthermore, the neighboring areas may be limited to only S1 or S2. After the determination of the current block S4, the dot pattern determination unit 324 generates a dot pattern area detection signal ht at 1 when a dot pattern area is detected. Otherwise, the dot pattern determination unit 324 generates the dot pattern area detection signal ht at 0 when a dot pattern area is not detected.

Referring back to FIG. 4A, a color detection unit 325 ultimately correctly determines the color of the input area. In general, the need for such correction arises from reading pixels in chromatic colors or achromatic color (black) in the input document, and a sampling rate and mechanical precision cause the relative and systematic discrepancy in the R, G and B data. As shown in FIG. 15(A), an ideal image intensity level signal representing black is uniform in the R, G and B intensity signal. However, as shown in FIG. 15(B), a practical image data signal is an ideal high-low wave form since an image is focused on a CCD device via a lens, the image intensity signal is generated by digitizing the CCD image signal. However, since an ordinary scanner utilizes a three-line CCD sensor, the R, G and B image data is not read simultaneously. Each of the R, G and B CCD sensor is physically separated and sequentially reads the same input document. Consequently, the read position discrepancy is resulted. For example, due to the read position discrepancy, the R, G and B intensity signal representing black as shown in FIG. 15(B) is relatively distorted in a range A as shown in FIG. 15 (C). When the distortion is substantially large, the color discrepancy appears surrounding the black area.

In general, the color detection unit 325 detects a chromatic area. The color detection unit 325 includes a color phase division unit 325a, a set of memory units 325b through e and a color pixel determination unit 325f. The color phase division unit 325a converts the input RGB image data into C, M, Y and W signals. As one example of the color phase division, a boundary for each R, G and B and the difference between minimal and maximal values for each R, G and B are defined as follows:

1) R-Y color phase area boundary (ry)

$$R-2*G+B>0$$

2) Y-G color phase area boundary (yg)

$$11*R-8*G-3*B>0$$

3) G-C color phase area boundary (gc)

$$1*R-5*G+4*B<0$$

4) C-B color phase area boundary (cb)

$$8*R-14*G+6*B<0$$

5) B-M color phase area boundary (bm)

$$9*R-2*G-7*B<0$$

6) M-R color phase area boundary (mr)

$$R+5*G-6*B<0$$

7) color determination w pixel determination:

$$(R<thwa) \ \& \ (G<thwa) \ \& \ (B<thwa) \ y=m=c=0$$

where thwa is a predetermined threshold value.
where R, G and B image data represents black by the highest number.

8) Y Pixel Determination $$(ry=1) \ \& \ (yg=0) \ \& \ (RGB>thy) \ y=1, m=c=0$$

9) G Pixel Determination $$(yg=1) \ \& \ (gc=0) \ \& \ (RGB>thg) \ c=y=1, m=0$$

10) C Pixel Determination $$(gc=1) \ \& \ (cb=0) \ \& \ (RGB>thg) \ c=1, m=y=0$$

11) B Pixel Determination $$(cb=1) \ \& \ (bm=0) \ \& \ (RGB>thg) \ m=c=1, y=0$$

12) M Pixel Determination $$(bm=1) \ \& \ (mr=0) \ \& \ (RGB>thg) \ m=1, y=c=0$$

13) R Pixel Determination $$(mr=1) \ \& \ (ry=0) \ \& \ (RGB>thg) \ y=m=1, c=0$$

14) BK Pixel Determination $$y=m=c=1 \text{ when 1) through 13) are not applicable.}$$

Furthermore, the color determination W pixel is outputted if the following relation is true:

$$(R<thw) \ \& \ (G<thw) \ \& \ (B<thw)$$

where thw is a predetermined threshold value.
Among the above determinations 1) through 14), a determination with a smaller number has a higher priority (i.e., 1) being the highest priority). The above thresholds thwa, thy thm, thc, thr, thg and thb are determined before the reproduction of an image starts, and thw>tha. The output signal c, m and y each has a one-bit and three-bit data while the color detection color pixel W has a single bit. The thresholds is different for each color phase since each color phase has a different range of a color phase boundary. The above color phase division boundaries are merely exemplary and are not limited. Five lines worth of the outputs c, m, y and W from the color phase division unit 325*a* are stored in line memory 325*b* through 325*e* and inputted into a color pixel determination unit 325*f*.

Referring to FIG. 6, one preferred embodiment of the color pixel determination unit 325*f* is illustrated in a block diagram. Five lines worth of c, m, y and W data are inputted into pattern matching units 325*f*5 through 325*f*7 as well as counter 325*f*1 through 325*f*4. The pattern matching unit 325*f*6 corrects c=m=y=0 in the color pixel W when the color pixel W exists. By this correction, the white level is increased in a 5×5 pixel matrix with the centrally located current pixel. The color phase division unit 325*a* runs a pattern matching on 5×5 pixel matrixes whose C, M and Y vales are not all either white 0 or black 1. The color pixel patterns that are used in he pattern matching are as follows:

1-1) pattern 1-1(pm1)
D23 & D33 & D43
1-2) pattern 1-2(pm2)
D32 & D33 & D34
1-3) pattern 1-3(pm3)
D22 & D33 & D44
1-4) pattern 1-4(pm4)
D24 & D33 & D42 where the current pixel is a centrally located pixel that is referenced by D33. FIG. 16 illustrates exemplary patterns pm1 through pm4 in which a white circle indicates a matrix whose value has 1 in at least one of C, M and Y. The above pattern matching is applied to avoid any isolated point in the data. On the other hand, in order to detect a small size area such as a dot pattern, the centrally located current pixel is examined to determine whether or not the current pixel has either C=M=Y=1 or C=M=Y=0.

Figure 17:
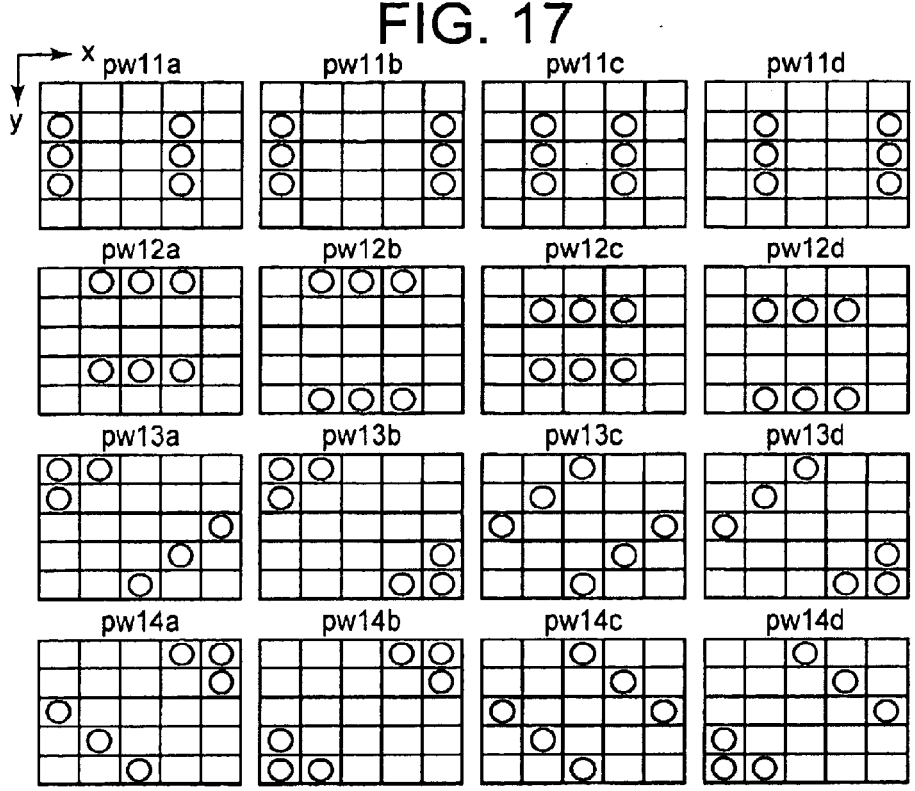
FIG. 17 illustrates exemplary line patterns in which a white circle indicates a pixel whose C, M and Y values are all 0.

Color lines that are surrounded by white areas are examined with respect to patterns. FIG. 17 illustrates exemplary line patterns in which a white circle indicates a pixel whose C, M and Y values are all 0. The color phase division unit 325*a* runs a pattern matching on 5×5 pixel matrixes against the patterns pw11*a* through pw14*d*. In case of a match, the current pixel is determined as a color line pixel. The following patterns are examples:

2-1) Pattern 2-1(pw11*a*~pw11*d*)
((D12&D13&D14) & (D42&D43&D44))#
((D12&D13&D14) & (D52&D53&D54))#
((D12&D23&D42) & (D42&D43&D44))#
((D12&D23&D42) & (D52&D53&D54))
2-2) Pattern 2-2(pw12*a*~pw12*d*)
((D21&D31&D41) & (D24&D34&D44))#
((D21&D31&D41) & (D25&D35&D45))#
((D22&D23&D24) & (D24&D34&D44))#
((D22&D23&D24) & (D25&D35&D45))
2-3) Pattern 2-3(pw13*a*~pw13*d*)
((D11&D21&D12) & (D35&D44&D53))#
((D11&D21&D12) & (D45&D44&D55))#
((D13&D22&D31) & (D35&D44&D53))#
((D13&D22&D31) & (D45&D44&D55))
2-4) Pattern 2-4(pw14*a*~pw14*d*)
((D13&D24&D35) & (D41&D51&D52))#
((D14&D15&D25) & (D41&D51&D52))#
((D13&D24&D35) & (D31&D42&D53))#
((D14&D15&D25) & (D31&D42&D53))

Figure 18:
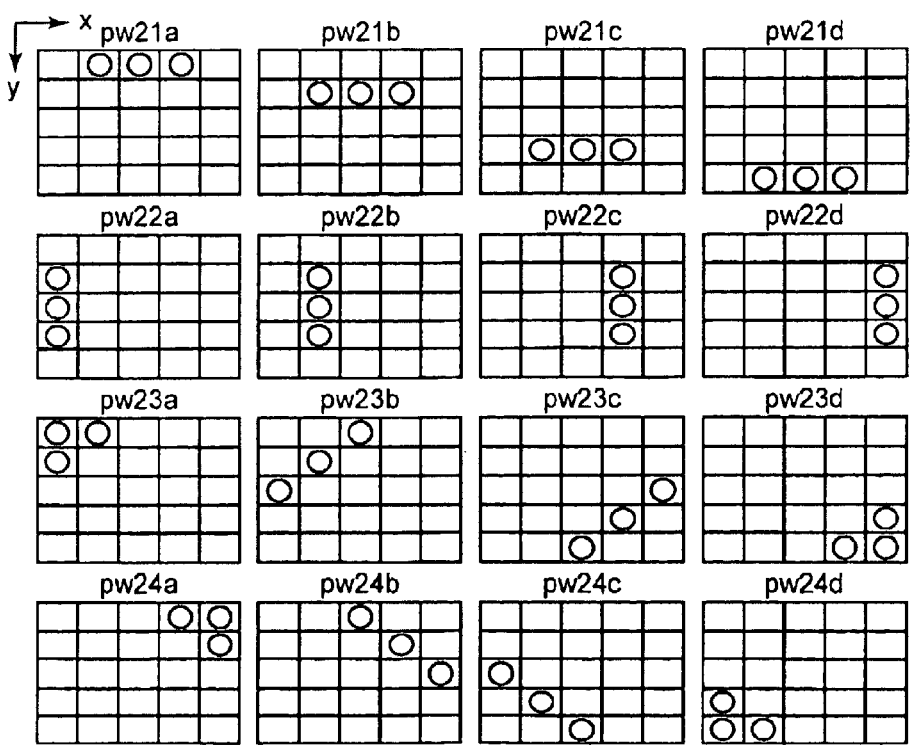
FIG. 18 illustrates exemplary white area patterns in which a white circle indicates a pixel whose C, M and Y values are all 0.

White areas are examined with respect to patterns. FIG. 18 illustrates exemplary white area patterns in which a white circle indicates a pixel whose C, M and Y values are all 0. The color phase division unit 325*a* runs a pattern matching on 5×5 pixel matrixes against the patterns pw21*a* through pw24*d*. In case of a match, the current pixel is determined as a color line pixel. The following patterns are examples:

3-1 Pattern 3-1(pw21*a*~pw21*d*)
(D21&D31&D41)#
(D22&D32&D42)#
(D24&D34&D44)#
(D25&D35&D45)
3-2 Pattern 3-2(pw22*a*~pw22*d*)
(D12&D13&D14)#
(D22&D23&D24)#
(D42&D43&D44)#
(D52&D53&D54)
3-3 Pattern 3-3(pw23*a*~pw23*d*)
(D52&D51&D41)#
(D53&D42&D31)#
(D35&D24&D13)#
(D25&D15&D14)
3-4) Pattern 3-4(pw24*a*~pw24*d*)
(D54&D55&D45)#
(D53&D44&D35)#
(D31&D22&D13)#
(D21&D11&D12)

The above described pattern matching results are now examined in view of the following relation. If the relation holds true, the current pixel is determined as a second color pixel candidate for the color determination.

$$((pm1=1) \ \& \ ((pw11=1)\#(pw21!=1)))\#$$

$$((pm2=1) \ \& \ ((pw12=1)\#(pw22!=1)))\#$$

$$((pm3=1) \ \& \ ((pw13=1)\#(pw23!=1)))\#$$

$$((pm4=1) \ \& \ ((pw14=1)\#(pw24!=1)))$$

where (pm1=1) means that the data distribution of the current pixel equals that of the pattern pm1. Similarly, (pw11=1) means that the data distribution of the current pixel equals that of any of the patterns pw11*a* through pw11*d* while (pw21!=1) means that the data distribution of the current pixel does not match any one of the patterns pw21*a* through pw21*d*. & is logical AND while # is logical OR. By the above result comparison, a color pixel that is surrounded by white areas is considered as the second color pixel candidate. A color pixel that matches a color pixel pattern also becomes the second color pixel candidate.

Referring to FIG. 6, a first counter 325*f*1 corrects the CMY data from the color phase division unit 325*a* to C=M=Y=0 when the color determination W pixel exists in a 5×5 pixel matrix with the centrally located pixel. By this correction, the white level of the matrix is increased. The second counter 325*f*1 counts a number of pixels whose C, M or Y value is 1 in the pixel matrix. For each of the C, M and Y counts, if the difference between the max and minimal counts exceeds a threshold thcnt and the minimal count is below thmin, a color pixel becomes a first color pixel candidate. The threshold values thcnt and thmin are set before the onset of the image reproduction. For each matrix, the image data is examined for the count on each of the C, M and Y planes. The minimal value is assumed to be black. By this assumption, even if the black pixel is not read, the correction is available. By the difference between the max and minimal values, a chromatic pixel is extracted. When a certain number of chromatic pixels exists in a 5×5 pixel matrix with the centrally located current pixel, the current pixel is considered as a chromatic pixel.

Still referring to FIG. 6, a color pixel determination unit 325*f*8 determines whether or not a current pixel is a color pixel based upon the outputs from the pattern matching unit 325f6 and the counter 325f1. That is, the color pixel determination unit 325f8 determines that the current pixel is a color pixel if the current pixel is the above described first color pixel candidate and the above described second color pixel candidate. A block unit 325f9 puts the output from the color pixel determination unit 325f8 in a block of 4×4 pixels. When there is more than one color pixel exists in a 4×4 pixel matrix, the block unit 325f9 outputs the entire pixel matrix as one color pixel block. Thus, the processes that follow the block unit 325f9 also output the block. An isolated point removing unit 325f10 removes any isolated block with respect to the current block of the data from the block unit 325f9. If a block adjacent to the current block is not a color pixel block, the adjacent block is removed as an isolated point. An enlargement unit 325f11 enlarges the 4×4 block output from the isolated point removing unit 325f10 to a 5×5 pixel block. This enlargement is performed so as to avoid the black character process on the boarder of the color pixels. The enlargement unit 325f11 outputs a B/C signal which is L (chromatic) in response to a color pixel block. The B/C signal is H (achromatic) when the color pixel block does not exist.

A second counter 325f2 corrects the CMY data from the color phase division unit 325a to C=M=Y=0 when the color determination W pixel exists in a 5×5 pixel matrix with the centrally located pixel. By this correction, the white level of the matrix is increased. The second counter 325f2 counts a number of pixels whose C, M or Y value is 1 in the pixel matrix. For each of the C, M and Y counts, if the difference between the max and minimal counts exceeds a threshold thacnt and the minimal count is below thamin, a color pixel becomes a first color pixel candidate. The threshold values thcnt and thmin are set before the onset of the image reproduction. For each matrix, the image data is examined for the count on each of the C, M and Y planes. The minimal value is assumed to be black. By this assumption, even if the black pixel is not read, the correction is available. By the difference between the max and minimal values, a chromatic pixel is extracted. When a certain number of chromatic pixels exists in a 5×5 pixel matrix with the centrally located current pixel, the current pixel is considered as a chromatic pixel.

Still referring to FIG. 6, a color pixel determination unit 325f12 determines whether or not a current pixel is a color pixel based upon the outputs from the pattern matching unit 325f6 and the second counter 325f2. That is, the color pixel determination unit 325f12 determines that the current pixel is a color pixel if the current pixel is the above described first color pixel candidate and the above described second color pixel candidate. A block unit 325f13 puts the output from the color pixel determination unit 325f12 in a second block of 4×4 pixels. When there is more than one color pixel exists in a 4×4 pixel matrix, the block unit 325f12 outputs the entire pixel matrix as one color pixel block. Thus, the processes that follow the block unit 325f12 also output the block. A density unit 325f14 makes the current block a second color pixel bloc when more than three color blocks exist in a 3×3 blocks and the current pixel is a color pixel.

A third counter 325f3 counts a number of pixels whose C, M or Y value is 1 in the pixel matrix. For each of the C, M and Y counts, if the difference between the max and minimal counts exceeds a threshold tha1cnt and the minimal count is below tha1min, a color pixel becomes a third color pixel candidate. The threshold values tha1cnt and tha1min are set before the onset of the image reproduction. A pattern matching unit 325f5 determines whether or not a pixel in C, M and Y from a color pixel detection is a color pixel based upon 5×5 pixel matrixes that are used by the pattern matching unit 325f6. A pixel that matches any one of the patterns becomes a fourth color pixel candidate. A color pixel determination unit 325f15 determines whether or not a current pixel is a color pixel based upon the color pixel candidate status. That is, the color pixel determination unit 325f12 determines that the current pixel is a third color pixel if the current pixel is the above described third color pixel candidate and the above described fourth color pixel candidate. A block unit 325f16 puts the output from the color pixel determination unit 325f15 in a third block of 4×4 pixels. When there is more than one third color pixel exists in a 4×4 pixel matrix, the block unit 325f12 outputs the entire pixel matrix as a third color pixel block. Thus, the processes that follow the block unit 325f16 also output the block. A density unit 325f17 makes the current block a third color pixel bloc when more than three color blocks exist in a 3×3 blocks and the current pixel is a color pixel.

A fourth counter 325f4 counts a number of pixels whose C, M or Y value is 1 in the pixel matrix. For each of the C, M and Y counts, if the count is more than the minimal threshold value thabk, the current pixel becomes a first black pixel candidate. The threshold value thabk is set before the onset of the image reproduction. A pattern matching unit 325f7 determines whether or not a current pixel block matches any one of 5×5 pixel matrixes that are C=M=Y=1 as shown in FIG. 16.

1-1) Pattern 1-1(pm1)
D23&D33&D43
1-2) Pattern 1-2(pm2)
D32&D33&D34
1-3) Pattern 1-3(pm)
D22&D33&D44
1-4) Pattern 1-4(pm4)
D42&D33&D24 where a white circle corresponding to the above index indicates a pixel having C=M=Y=1. The current pixel becomes a second black pixel candidate when any one of the above patterns is matched. Thus, an achromatic determination unit 325f18 determines that the current pixel becomes a black pixel when the current pixel is both the first black pixel candidate and the second black pixel candidate. A block unit 325f19 puts the output from the color pixel determination unit 325f15 in a block of 4×4 pixels. When there is more than one black pixel exists in a 4×4 pixel matrix, the block unit 325f19 outputs the entire pixel matrix as a third color pixel block. Thus, the processes that follow the block unit 325f19 also output the block. An enlargement unit 325f20 converts the current block into a non-active or a non-black block within a 3×3 block matrix if the current block is an active block or a black block and the surrounding pixels are non-active or non-black.

Referring back to FIG. 6, a total color pixel determination unit 325f21 determines that the current block is a color block if the color pixel determination unit 325f12 has found a second color pixel and the achromatic determination unit 325f18 has not found a black pixel. Similarly, the total color pixel determination unit 325f21 determines that the current block is a color block if the color pixel determination unit 325f15 has found a color pixel. The enlargement unit 325f22 makes the current block an active block when there is at least one active block in a 9×9 block matrix with the centrally located current block in order to consider that a small character that has been determined as a color pixel by the total color pixel determination unit 325f21 to be continuous. This enlargement allows to fill a gap between characters. A continuous counter 325f23 determines whether or not an input document is a color document based upon the color block continuity. The continuous counter 325f23 determines the continuity by counting a number of continuous color pixels in the color pixel block output from the enlargement unit 325f22.

Figure 7:
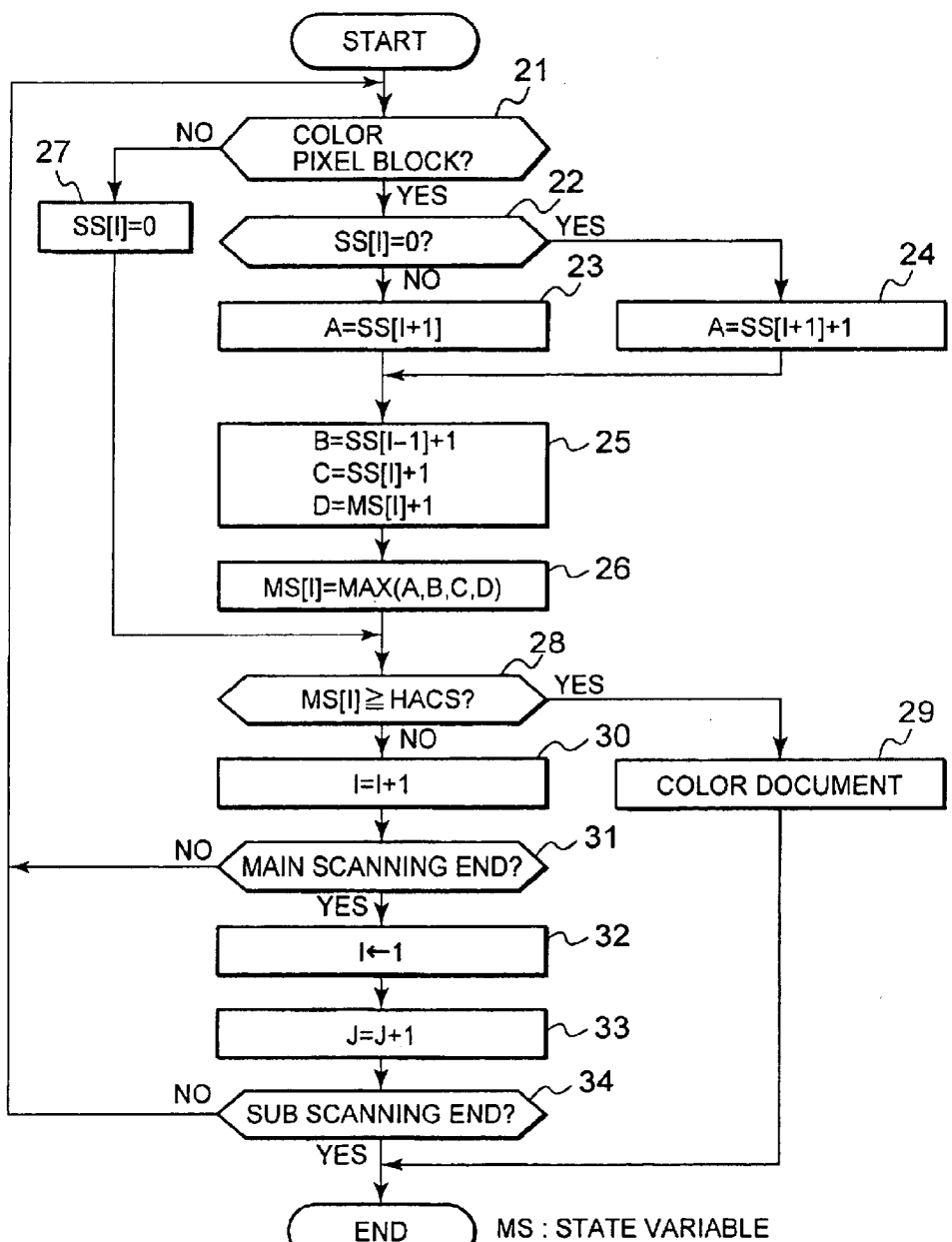
FIG. 7 is a flow chart illustrating steps involved in one preferred process of determining an extent of continuous color pixels according to the current invention.

Referring to FIG. 7, a flow chart illustrates steps involved in one preferred process of determining an extent of continuous color pixels according to the current invention. In general, when the current pixel is in a color pixel block, a continuous number of color pixels is determined by examining upper left, above, upper right and left pixels as seen in steps 21 through 26. For example, assuming that the current pixel is c3 pixel in a 5×5 pixel distribution pattern MPp shown in FIG. 11, the upper left, above, upper right and left pixels are respectively b2, b3, b4 and c2. On the other hand, if the current pixel is not in a color pixel block, a zero continuous color pixel value is given as seen in steps 21 through 27. It is determined whether or not the current pixel c3 is within a color pixel block in a step 21. When it is true, the continuous color pixel number for the above pixel b3 is examined in a step 22. If it is zero, an index value A is assigned the continuous color pixel number of the upper right pixel b4 plus one in step 24. On the other hand, the continuous color pixel number of the above pixel b3 is not zero, an index value A is assigned the continuous color pixel number of the upper right pixel b4 in step 23. Following the steps 24 and 25, an index value B is assigned the continuous color pixel number of the upper left pixel b2 plus one in step 26. Also in the step 26, an index value C is assigned the continuous color pixel number of the upper pixel b3 plus one, and an index value D is assigned the continuous color pixel number of the left pixel c2 plus one. In step 26, the maximal number among the index numbers A, B, C and D is taken as the continuous color pixel number of the current pixel c3.

Still referring to FIG. 7, after the continuous color pixel number of the current pixel has been determined as described above, the continuous color pixel number is compared against a threshold value thacs in step 28. If the continuous color pixel number exceeds the threshold thacs, the input document is not determined as a color document in step 29 and the preferred process ends. On the other hand, the continuous color pixel number fails to exceed the threshold thacs, the above described steps 21 through 28 are repeated for a next pixel. That is, in step 30, a main scanning position index i is incremented, and the index i is checked in step 31 if it indicates the end of the main scanning direction. If it is the end, the index i is reset to 1 in step 32 while the sub-scanning position index j is incremented in step 33. Finally, the sub-scanning direction end is checked in step 34, and if it is the end of the both main and sub scanning position without the determination for the color document, the preferred process also ends with the determination for a black-and-white document.

The above described continuous color pixel count is a sum of an approximately vertical color line and an approximately horizontal color line. To avoid a double count, the continuous color pixel count for the upper right pixel is different from other continuous color pixel counts. Referring to FIG. 19, an example of the continuous color pixel count data is illustrated. Each rectangle indicates one color pixel while a number is the continuous color pixel count for the color pixel. Within a single document, if the continuous color pixel count exceeds the predetermined threshold value thacs, the document is determined to be color.

In order to increase the accuracy of the color/black-and-white document determination, the color pixel determination unit is divided into the three color pixel determination units 325f8, 325f12 and 325f15. The erroneous color pixel determination for the black character processing is not significant and noticeable. On the other hand, the color/black-and-white document determination is significant and affects the entire document. For this reason, the counters 325f1 through 325f4 are separated and made independent. Although the color phase division unit 325a should have separate units, since the memory requirements for the pattern matching units 325f5 through 325f7 significantly increase, it is not desirable. The parameters, the first and third color pixel candidates in the counters 325f1 through 325f4 enable to modify the color pixel parameters or the first, second and third color pixels so as to reduce the memory requirements. The color pixel determination units 325f12 and 325f15 are provided to detect a light color such as a yellow color of a high-lighter pen. Furthermore, the black pixel or achromatic determination unit 325f18 is provided to correct data in case of erroneous detection when a color is light. It is acceptable to correct the light color such as a high-lighter color for a certain width by the black data. When a plurality of color pixels is extracted, since only the W (white) label is changed, it is not necessary to have two memory units. The capacity for one memory unit and one line is sufficient.

The continuous counter 325f23 counts the number by examining the current line data and the one-line-previous line data so as to correctly count the continuous number of surrounding pixels. Although the above described preferred embodiment performed the color determination on the R, G and B image data, the current invention is not limited to the R, G and B data and includes other data such as Lab data.

Referring back to FIG. 4A, the final determination unit 326 includes a character determination unit 326a, an enlargement processing unit 326b, a character inner space determination unit 326c and a decoder 326d. The character determination unit 326a determines that the current data is a character edge area when the output from the edge extraction unit 322 indicates an edge, the dot pattern detection unit 324 indicates no dot pattern and the white area extraction unit 323 indicates a white area. Otherwise, the character determination unit 326a determines that the current data is a non-character edge area (i.e., a graphical area or character inner space area). The enlargement processing unit 326b performs the 8×8 block logical OR operation on the result from the character determination unit 326b and then the 3×3 block logical AND operation. The enlargement processing unit 326b subsequently enlarges four blocks. That is, if any block in the 8×8 block with the centrally located current pixel is a character edge, the current block is assumed as a character edge block. If all of the 3×3 block with the centrally located current block are character edges, the current block and the three adjacent blocks are definitively determined as character edges. The reason for performing the OR operation first and then the AND operation is that in case of a black character if small non-black character areas exist around the black character, the resulted data appear unnatural, and the black appear washed away or faded. To avoid these affects, the first OR operation increases the non-black character areas while the AND operation brings the desired enlargement.

In general, a color copier scans four times to reproduce one image. For each scan, the character determination is slightly different. Especially, when a non-black character determination is made during a black image formation and a black character determination is made during a non-black image formation, a black character area becomes lighter. For this reason, the 8×8 block OR operation is performed and the 3×3 block AND operation is followed during the black image formation. On the other hand, the 5×5 block OR operation is performed and the 1×1 block AND operation is followed during the non-black image formation. The above 1×1 block AND operation means that since the results are the same as before, the operation has no effect. The results of the enlargement process are outputted to the decoder 326d as the character edge signal. The above described enlargement process substantially eliminates the fading of the character areas due to the non-uniform results from the separate processing. Although the above described enlargement process may darken the inner portions of the character, since the inner portion is lighter with respect to the character edge areas and is saturated, the results do not appear unnatural.

FIG. 20 illustrates diagrams that enlarge the overlapping of the color material or colorants for color image duplication. FIG. 20(D) illustrates an ideal black character process for the four colorants. FIG. 20(E) illustrates a black character process for the four colorants with a fading appearance since the correction does not take place for the black colorant while the correction takes place for other colorants. FIG. 20(F) illustrates a desirable output when a black character process is limited only to the black according to the current invention. Furthermore, FIG. 20(G) illustrates a desirable output when a black character process is limited only to the black and the correction is avoided for the black while the correction is applied to the non-black according to the current invention.

Figure 20A:
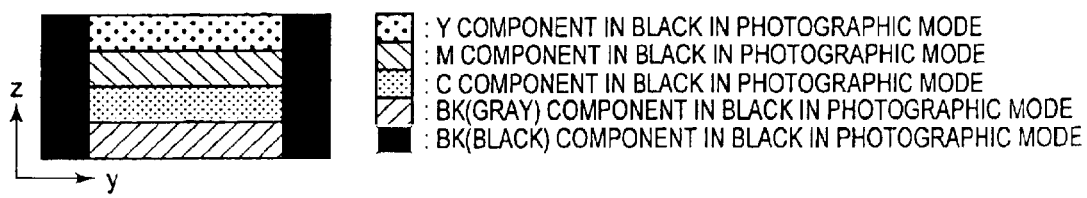
FIG. 20 illustrates diagrams that enlarge the overlapping of the color material or colorants for color image duplication.
Figure 20B:
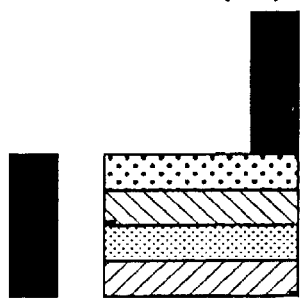
Figure 20C:
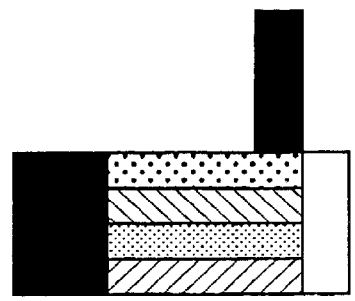
Figure 20D:
Figure 20E:
Figure 20F:
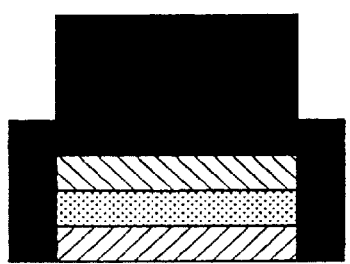
Figure 20G:
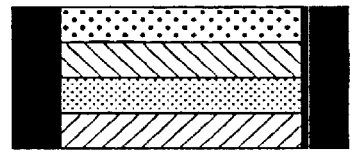

FIG. 20(A) illustrates a desirable output when a black character is processed at a uniform enlargement rate. FIG. 20(B) illustrates an output when a black character is processed at a uniform enlargement rate, but the printing position has been shifted. FIG. 20(C) illustrates an output when a black character is processed at a large enlargement rate, and the printing position has been shifted.

Referring back to FIG. 4A, the character inner space determination area 326c generates a character inner space signal indicative of a character inner space based upon the results from the edge extraction unit 322, the white area extraction unit 323, the dot pattern extraction unit 324, the color determination unit 325 and the character determination unit 326a. To generate the character inner space signal, the following signals are first generated. An inner space character signal is generated by ORing in a 5×5 block the output signal from the character determination unit 326a, and the output signal is indicative of character edge/non-edge. A white block black character signal A is active when the inner space character signal is active, the output from the white block correction 323g exists, and the output from the color determination unit 325 is non-active (i.e, achromatic). That is, the active white block black character signal A indicates a black character that is surrounded by white areas, and such a black character candidate is highly likely to be a character. A dark black area signal B is active when the output from the white area extraction unit 323 that has been 3×3 block ORed is active, the output from the dot pattern extraction unit 324 is non-active, the inner space character signal is non-active. The dark black area signal B indicates a dark black area. Since the inner space of a black character is dark, other conditions are examined in combination to determine whether or not it is an inner space area. The black character C is active when the inner space character signal is active and the output from the color determination unit 325 is non-active. The black character portions are likely to be a character edge portion, and the character inner space is also likely to exist around the black character portions.

The character inner space candidate portions are examined in the following manner. Based upon the white block black character signal (A), the dark black area signal (B) and the black character (C), a character inner space candidate signal Q is expressed as follows:

$$Q24 = (A21 \ \& \ A22 \ \& \ A23 \ \& \ A24) \# ((Q13 \# Q23 \# Q14 \# Q15) \ \& \ (B24 \# C24))$$

where a letter corresponds to one of the above described signals. Following the letter, the first number 2 indicates the current line Y2 while the first number 1 indicates a previous line Y1. The second number indicates a X position on the line. The above relation is shown in FIG. 21. The above equation means that if the white block black character signal (A) is continuously active (A21 through A24 all active), the current pixel is assumed to be a character inner space candidate. Subsequently, the candidacy is confirmed. That is, the pixel Q13, Q23, Q14 or Q15 that has been determined to have a character inner space candidate near the dark black area signal B24 or the black character C24, the current pixel is also confirmed as a character inner space candidate. In other words, a continuous group of the white block black character signals (A) triggers the confirmation of the character inner space candidates.

In case of a black character that is surrounded by white background (i.e., an active white block black character signal A), it is likely that a character exists. When the active white block black character signals A exist in a continuous manner, it is likely that a character edge exists and that character inner space regions also exist. Thus, the current pixel Q24 is a character inner space candidate. The result is outputted to the decoder 326d, which ultimately determines that the character inner space candidate is indeed a character inner space.

Referring back to FIG. 4A, the decoder 326d generates a character inner space confirmed signal based upon the character inner space candidate (i.e., the signal Q: active). The character inner space confirmed signal is activated when the character edge signal is non-active and the character inner space candidate signal is active. The decoder 326d ultimately generates a C/P signal as follows:

| C/P signal | character edge signal | character inner space signal | area determination result |
|---|---|---|---|
| 0 | none | none | graphics area |
| 1 | none | yes | character inner space |
| 2 | — | — | — |
| 3 | yes | x | character edge area | where "—" indicates that the decoder does not output the C/P signal at the value of 2.

Referring back to FIG. 3, the C/P signal and the B/C signal that the document recognition unit 320 generates are outputted to the RGB filter unit 330, the color correction unit 340, the variable size unit 350, the interface unit 352, the UCR 360, the CMYBk filter unit 370, the CMYBk γ correction unit 380, a gradation processing unit 390 in response to image data. The RGB filter 330 is a filter for MTF correcting RGB data for determining an average of products between a corresponding matrix of weight coefficients and each of N×N image matrix data. When the C/P signal is 3 (i.e., character edge area), a matrix of coefficients for sharpening an image. When the C/P signal is 1 or 0 (i.e., character inner space area or a graphics area), a matrix of coefficients for smoothing an image. The RGB filter 330 outputs an weighted average to the color correction unit 340. The color correction unit 340 converts the RGB data into the CMY data via a masking process. The variable size unit 350 performs the variable size process to enlarge or reduce the image data in both the main and sub scanning directions.

Still referring to FIG. 3, the UCR 360 improves the color reproduction of the image data by generating the Bk data from the UCR process on the common parts of the C, M and Y data from the color correction unit 340. The UCR 360 thus outputs the C, M, Y and Bk image data. When the C/P signal is not 3 (i.e., character inner space area or a graphics area), a skeleton black process is performed. When the C/P signal is 3 (i.e., character edge area), a full black process is performed. When the C/P signal is 3 (i.e., character edge area) and the B/C signal is H (i.e., achromatic), the C, M and Y data is erased. That is, the last case is a black character, and only the black colorant is used.

The UCR outputs an output image signal IMG, which is only one color of the C, M, Y or Bk. As described before, for full color, the document is scanned four times while for black and white, the document is scanned only once. Based upon the above described color determination, without the operator selection, the B/C signal value determines the above color/black and white selection.

The CMYBk filter 370 uses a N×N space filter in response to the frequency response of the color printer 400 and the C/P signal to perform sharpening or smoothing operations. The CMYBk correction unit 380 modifies the γ curve in response to the frequency response of the color printer 400 and the C/P signal. When the C/P signal is either 0 or 1, the γ curve is selected to reproduce an image in a faithful manner. When the C/P signal is 3, the γ curve is selected to enhance the contrast.

The gradation unit 390 performs the dithering and the error diffusion processes in response to of the color printer 400 and the C/P signal. In the Bk image formation, if the C/P signal is 0, the gradation has a high priority. If the C/P signal is not 0, the resolution has a high priority. In the non-Bk image formation, if the C/P signal is 0 or 1, the gradation has a high priority. If the C/P signal is 3, the resolution has a high priority. The video controller 359 outputs the above described image data via its buffer memory to the color printer 400 in synchronous with an image data writing operation.

The above IPU 300 performs the image smoothing operation via the RGB filter 330 when the C/P signal is 0. The UCR 360 performs the skeleton black operation while the CMYBk γ correction unit 380 selects a curve that is suited for linear gradation. The CMYBk filter 370 and the gradation unit 390 process the data with the gradation as a high priority. On the other hand, in case of character processing (i.e., C/P=3 and C/B=L), the RGB filter 330 enhances edges, and the UCR 360 performs the full black process. The CMYBk γ correction unit 380 selects a curve that is suited for contrast. The CMYBk filter 370 and the gradation unit 390 process the data with the resolution as a high priority.

In case of black character processing (i.e., C/P=3 and C/B=H), the C, M and Y data is not printed during the C, M and Y image formation. This is to prevent any coloring areas that is surrounding the black character due to the positional discrepancies. In this case, the RGB filter 330 may emphasize the edges more than the color characters.

In case of the character inner space operation (i.e., C/P= 1), the RGB filter 330 performs the smooth operation while the UCR 360 performs the skeleton black operation. 1e the CMYBk γ correction unit 380 selects a curve that is suited for linear gradation. The CMYBk filter 370 processes the data with the gradation as a high priority.

Thus, the IPU 300 performs four operations including graphics, character edge, character over graphics and character inner space.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of correctly identifying areas near character edges in character image data, comprising:

performing an edge-enhancement process on the character image data so as to generate edge-enhanced character image data by detecting edges in the portion of the character image data to generate an edge signal;

performing a combination of predetermined tests including a first dot pattern peak test on a portion of the character image data representing a character and a background in sets of pixel color component values, the predetermined tests each determining whether or not the portion is a white area and generating a set of test results, performing said first dot pattern peak test based upon a first certain set of color component pixel values of the portion to determine a first dot pattern peak, a first component of said first dot pattern peak test determining whether or not a color component pixel value of a centrally located pixel of the portion has the highest value of the lowest value in the portion, a second component of said first dot pattern peak test determining whether or not an absolute difference in the color component pixel value of the centrally located pixel and an average of each pair of the color component pixel values of pixels that are symmetrically located about the centrally located pixel exceeds a predetermined dot pattern peak threshold value;

assigning a white level value to the portion based upon the test of the predetermined tests;

comparing the portion to a set of predetermined white patterns if the white level value and the test results satisfy one of predetermined conditions; and converting each of the pixel values in the portion to white if the portion contains one of the predetermined white patterns to generate a white converted portion.

2. The method of identifying character edge areas in character image data according to claim 1 wherein a first one of the predetermined tests determines whether or not every one of the pixel color component values is below a first predetermined threshold value.

3. The method of identifying character edge areas in character image data according to claim 2 wherein a second one of the predetermined tests includes a comparison that any B image data of RGB image data in a predetermined size matrix with a centrally located current pixel is under a predetermined threshold.

4. The method of identifying character edge areas in character image data according to claim 3 wherein a third one of the predetermined tests includes a first component that determines a first minimal value (miny) among a set of the pixel color component values of first pixels and a first maximal value (maxy) among a set of the pixel color component values of second pixels including a centrally located pixel, a second component determining a second minimal value (mint) among a set of the pixel color component values of third pixels and a second maximal value (maxt) among a set of the pixel color component values of fourth pixels including the centrally located pixel, a third component determining ((miny-maxy)>0) # ((mint-maxt)>0), # being taking the larger of ((miny-max)>0) and ((mint-max)>0).

5. The method of identifying character edge areas in character image data according to claim 4 wherein said white level value is assigned a predetermined highest value when the test results of said first one of the predetermined tests are affirmative.

6. The method of identifying character edge areas in character image data according to claim 5 wherein the test results of said second one of the predetermined tests are examined if the test results of said first one of the predetermined tests are negative.

7. The method of identifying character edge areas in character image data according to claim 6 wherein said white level value is decremented by a predetermined value when the test results of said second one of the predetermined tests are negative.

8. The method of identifying character edge areas in character image data according to claim 6 wherein the pixel color component values are binarized when the test results of said second one of the predetermined tests are affirmative, a predetermined first white value threshold, a predetermined second white value threshold as well as a predetermined value being adjustably defined.

9. The method of identifying character edge areas in character image data according to claim 8 wherein if the binarized pixel component values are determined as a white area and said white level value is equal to or above the predetermined first white value threshold, said white level value is incremented by the predetermined value.

10. The method of identifying character edge areas in character image data according to claim 8 wherein if the binarized pixel component values are determined as a non-white area, said white level value is decremented by the predetermined value.

11. The method of identifying character edge areas in character image data according to claim 8 wherein the test results of said third one of the predetermined tests are examined if the binarized pixel component values are determined as a white area, said white level value is not equal to or above the predetermined first white value threshold and, said white level value is equal to or above a predetermined second white value threshold.

12. The method of identifying character edge areas in character image data according to claim 11 wherein if the test results of said third one of the predetermined tests are negative, said white level value is decremented by the predetermined value.

13. The method of identifying character edge areas in character image data according to claim 8 wherein if the binarized pixel component values are determined as a white area and said white level value is not equal to or above the predetermined first white value threshold and the predetermined second white value threshold, said white level value is decremented by the predetermined value.

14. The method of identifying character edge areas in character image data according to claim 2 wherein a second one of the predetermined tests includes a first component that generates A=1 if a difference between maximal one and a minimal one of the pixel color component values of a predetermined centrally located pixel is above a second predetermined threshold value, otherwise, A=O, a second component generating B=1 if any one of the pixel color component values of a predetermined pattern of first pixels near the centrally located pixel is below a third threshold value, otherwise, B=O, a third component generating C=1 if any one of the pixel color component values of the predetermined pattern of second pixels that is symmetrical to the first pixels about the centrally located pixel is below the third threshold value, otherwise, C=O, a fourth component determining A AND (B XNOR C).

15. The method of identifying character edge areas in character image data according to claim 14 wherein a third one of the predetermined tests includes a first component that determines a first minimal value (miny) among a set of the pixel color component values of first pixels and a first maximal value (maxy) among a set of the pixel color component values of second pixels including a centrally located pixel, a second component determining a second minimal value (mint) among a set of the pixel color component values of third pixels and a second maximal value (maxt) among a set of the pixel color component values of fourth pixels including the centrally located pixel, a third component determining ((miny-maxy)>0) # ((mint-maxt)>0), # being taking the larger of ((miny-max)>0) and ((mint-max)>0).

16. The method of identifying character edge areas in character image data according to claim 15 wherein said white level value is assigned a predetermined highest value when the test results of said first one of the predetermined tests are affirmative.

17. The method of identifying character edge areas in character image data according to claim 16 wherein the test results of said second one of the predetermined tests are examined if the test results of said first one of the predetermined tests are negative.

18. The method of identifying character edge areas in character image data according to claim 17 wherein said white level value is decremented by a predetermined value when the test results of said second one of the predetermined tests are affirmative.

19. The method of identifying character edge areas in character image data according to claim 17 wherein the pixel color component values are binarized when the test results of said second one of the predetermined tests are negative, a predetermined first white value threshold, a predetermined second white value threshold as well as a predetermined value being adjustably defined.

20. The method of identifying character edge areas in character image data according to claim 19 wherein if the binarized pixel component values are determined as a white area and said white level value is equal to or above the predetermined first white value threshold, said white level value is incremented by the predetermined value.

21. The method of identifying character edge areas in character image data according to claim 19 wherein if the binarized pixel component values are determined as a non-white area, said white level value is decremented by the predetermined value.

22. The method of identifying character edge areas in character image data according to claim 19 wherein the test results of said third one of the predetermined tests are examined if the binarized pixel component values are determined as a white area and said white level value is not equal to or above the predetermined first white value threshold, and said white level value is equal to or above the predetermined second white value threshold.

23. The method of identifying character edge areas in character image data according to claim 22 wherein if the test results of said third one of the predetermined tests are negative, said white level value is decremented by the predetermined value.

24. The method of identifying character edge areas in character image data according to claim 19 wherein if the binarized pixel component values are determined as a white area and said white level value is not equal to or above the predetermined first white value threshold and the predetermined second white value threshold, said white level value is decremented by the predetermined value.

25. The method of identifying character edge areas in character image data according to claim 1 further comprising performing a second dot pattern peak test based upon a second certain set of color component pixel values of the portion to determine a second dot pattern peak, a first component of said second dot pattern peak test determining whether or not a color component pixel value of a centrally located pixel of the portion has the highest value or the lowest value in the portion; a second component of said second dot pattern peak test determining whether or not an absolute difference in the color component pixel value of the centrally located pixel and an average of each pair of the color component pixel values of pixels that are symmetrically located about the centrally located pixel exceeds the predetermined dot pattern peak threshold value.

26. The method of identifying character edge areas in character image data according to claim 25 further comprising generating the dot pattern peak signal if a total number of the first dot pattern peaks and the second dot pattern peaks in the portion exceeds a predetermined total dot pattern threshold value.

27. The method of identifying character edge areas in character image data according to claim 26 further comprising determining whether or not the portion is a part of a character based upon the white converted portion, the edge signal and the dot pattern peak signal.

28. The method of identifying character edge areas in character image data according to claim 25 further comprising determining a color component continuous pixel number of each of color components in the portion based upon a predetermined set of continuous pixel patterns.

29. The method of identifying character edge areas in character image data according to claim 28 further comprising determining whether or not the portion is a part of an inner space of a character based upon the white converted portion, the dot pattern peak signal and the color component continuous pixel number.

30. A system for correctly identifying areas near character edges in character image data, comprising:
   an input unit for inputting character image data representing a character and a background in sets of pixel color component values;
   an edge detection unit connected to said input unit for detecting edges in the portion of the character image data to generate an edge signal;
   a dot pattern extraction unit connected to said input unit for performing a first dot pattern peak test based upon a first certain set of color component pixel values of the portion to determine a first dot pattern peak, a first component of said first dot pattern peak test determining whether or not a color component pixel value of a centrally located pixel of the portion has the highest value or the lowest value in the portion, a second component of said first dot pattern peak test determining whether or not an absolute difference in the color component pixel value of the centrally located pixel and an average of each pair of the color component pixel values pixels that are symmetrically located about the centrally located pixel exceeds a predetermined dot pattern peak threshold value;
   a white extraction unit connected to said input unit for performing a combination of predetermined tests on a portion of the character image data, the predetermined tests each determining whether or not the portion is a white area and generating a set of test results; and
   a white determination unit connected to said white extraction unit for assigning a white level value to the portion based upon the test results of the predetermined tests; and
   a white pattern matching unit connected to said white determination unit for comparing the portion to a set of predetermined white patterns if the white level value and the test results satisfy one of predetermined conditions.

31. The system for identifying character edge areas in character image data according to claim 30 further comprising:
   an edge enhancement unit connected between said input unit and said white extraction unit for performing an edge-enhancement process on the character image data so as to generate edge-enhanced character image data; and
   a white correction unit connected to said white pattern matching unit for converting each of the pixel values in the portion to white if the portion contains one of the predetermined white patterns to generate a white converted portion.

32. The system for identifying character edge areas in character image data according to claim 30 wherein said white determination unit performs a first one of the predetermined tests to determine whether or not every one of the pixel color component values is below a first predetermined threshold value.

33. The system for identifying character edge areas in character image data according to claim 32 wherein said white determination unit performs a second one of the predetermined tests to detects if any B image data of RGB image data in a predetermined size matrix with a centrally located current pixel is under a predetermined threshold.

34. The system for identifying character edge areas in character image data according to claim 33 wherein said white determination unit performs a third one of the predetermined tests, the third one of the predetermined tests including a first component that determines a first minimal value (miny) among a set of the pixel color component values of first pixels and a first maximal value (maxy) among a set of the pixel color component values of second pixels including a centrally located pixel, a second component determining a second minimal value (mint) among a set of the pixel color component values of third pixels and a second maximal value (maxt) among a set of the pixel color component values of fourth pixels including the centrally located pixel, a third component determining ((miny-maxy)>0) # ((mint-maxt)>0), # being taking the larger of ((miny-max)>0) and ((mint-max)>0).

35. The system for identifying character edge areas in character image data according to claim 34 wherein said white determination unit assigns said white level value a predetermined highest value when the test results of said first one of the predetermined tests are affirmative.

36. The system for identifying character edge areas in character image data according to claim 35 wherein said white determination unit decrements said white level value by a predetermined value when the test results of said second one of the predetermined tests are negative.

37. The system for identifying character edge areas in character image data according to claim 34 wherein said white extraction unit examines the test results of said second one of the predetermined tests when the test results of said first one of the predetermined tests are negative.

38. The system for identifying character edge areas in character image data according to claim 37 wherein said white determination unit binarizes the pixel color component values when the test results of said second one of the predetermined tests are affirmative, a predetermined first white value threshold, a predetermined second white value threshold as well as a predetermined value being adjustably defined.

39. The system for identifying character edge areas in character image data according to claim 38 wherein if said white determination unit determines the binarized pixel component values as a white area and that said white level value is equal to or above the predetermined first white value threshold, said white determination unit increments said white level value by the predetermined value.

40. The system for identifying character edge areas in character image data according to claim 38 wherein if said white determination unit determines the binarized pixel component values as a non-white area, said white determination unit decrements said white level by the predetermined value.

41. The system for identifying character edge areas in character image data according to claim 38 wherein said white determination unit examines the test results of said third one of the predetermined tests if the binarized pixel component values are determined as a white area, said white level value is not equal to or above the predetermined first white value threshold and said white level value is equal to or above a predetermined second white value threshold.

42. The system for identifying character edge areas in character image data according to claim 41 wherein if the test results of said third one of the predetermined tests are negative, said white determination unit decrements said white level value by the predetermined value.

43. The system for identifying character edge areas in character image data according to claim 38 wherein if said white determination unit determines the binarized pixel component values as a white area and said white level value is not equal to or above the predetermined first white value threshold and the predetermined second white value threshold, said white determination unit decrements said white level value by the predetermined value.

44. The system for identifying character edge areas in character image data according to claim 32 wherein said white determination unit performs a second one of the predetermined tests, the second one of the predetermined tests including a first component that generates A=1 if a difference between a maximal one and a minimal one of the pixel color component values of a predetermined centrally located pixel is above a second predetermined threshold value, otherwise, A=0, a second component generating B=1 if any one of the pixel color component values of a predetermined pattern of first pixels near the centrally located pixel is below third threshold value, otherwise, B=O, a third component generating C=1 if any one of the pixel color component values of the predetermined pattern of second pixels that is symmetrical to the first pixels about the centrally located pixel is below the third threshold value, otherwise, C=O, a fourth component determining A AND (B XNOR C).

45. The stem for identifying character edge areas in character image data according to claim 44 wherein said white determination unit performs a third one of the predetermined tests, the third one of the predetermined tests including a first component that determines a first minimal value (miny) among a set of the pixel color component values of first pixels and a first maximal value (maxy) among a set of the pixel color component values of second pixels including a centrally located pixel, a second component determining a second minimal value (mint) among a set of the pixel color component values of third pixels and a second maximal value (maxt) among a set of the pixel color component values of fourth pixels including the centrally located pixel, a third component determining ((miny-maxy)>0) # ((mint-maxt)>0), # being taking the larger of ((miny-max)>0) and ((mint-max)>0).

46. The system for identifying character edge areas in character image data according to claim 45 wherein said white determination unit assigns said white level value a predetermined highest value when the test results of said first one of the predetermined tests are affirmative.

47. The system for identifying character edge areas in character image data according to claim 45 wherein said white extraction unit examines the test results of said second one of the predetermined tests when the test results of said first one of the predetermined tests are negative.

48. The system for identifying character edge areas in character image data according to claim 47 wherein said white determination unit decrements said white level value by a predetermined value when the test results of said second one of the predetermined tests are affirmative.

49. The system for identifying character edge areas in character image data according to claim 47 wherein said white determination unit binarizes the pixel color component values when the test results of said second one of the predetermined tests are negative, a predetermined first white value threshold, a predetermined second white value threshold as well as a predetermined value being adjustably defined.

50. The system for identifying character edge areas in character image data according to claim 49 wherein if said white determination unit determines the binarized pixel component values as a white area and said white level value is equal to or above the predetermined first white value threshold, said white determination unit increments said white level value by the predetermined value.

51. The system for identifying character edge areas in character image data according to claim 49 wherein if said white determination unit determines the binarized pixel component values as a non-white area, said white determination unit decrements said white level by the predetermined value.

52. The system for identifying character edge areas in character image data according to claim 51 wherein said white determination unit examines the test results of said third one of the predetermined tests if the binarized pixel component values are determined as a white area, said white level value is not equal to or above the predetermined first white value threshold and said white level value is equal to or above the predetermined second white value threshold.

53. The system for identifying character edge areas in character image data according to claim 52 wherein if the test results of said third one of the predetermined tests is negative, said white determination unit decrements said white level value by the predetermined value.

54. The system for identifying character edge areas in character image data according to claim 51 wherein if said white determination unit determines the binarized pixel component values as a white area and said white level value is not equal to or above the predetermined first white value threshold and the predetermined second white value threshold, said white determination unit decrements said white level value by the predetermined value.

55. The system for identifying character edge areas in character image data according to claim 33 wherein said dot pattern extraction unit performs a second dot pattern peak test based upon a second certain set of color component pixel values of the portion to determine a second dot pattern peak, a first component of said second dot pattern peak test determining whether or not a color component pixel value of a centrally located pixel of the portion has the highest value or the lowest value in the portion; a second component of said second dot pattern peak test determining whether or not an absolute difference in the color component pixel value of the centrally located pixel and an average of each pair of the color component pixel values of pixels that are symmetrically located about the centrally located pixel exceeds the predetermined dot pattern peak threshold value.

56. The system for identifying character edge areas in character image data according to claim 55 wherein said dot pattern extraction unit further generating the dot pattern peak signal if a total number of the first dot pattern peaks and the second dot pattern peaks in the portion exceeds a predetermined total dot pattern threshold value.

57. The system for identifying character edge areas in character image data according to claim 56 further comprising a character final determination unit connected to said white correction unit and said dot pattern extraction unit for determining whether or not the portion is a part of a character based upon the white converted portion, the edge signal and the dot pattern peek signal.

58. The system for identifying character edge areas in character image data according to claim 55 further comprising a color determination unit connected to said input unit for determining a color component continuous pixel number of each of color components in the portion based upon a predetermined set of continuous pixel patterns.

59. The system for identifying character edge areas in character image data according to claim 58 further comprising a character inner space final determination unit connected to said color determination unit, said white correction unit and said dot pattern extraction unit for determining whether or not the portion is a part of an inner space of a character based upon the white converted portion, the dot pattern peak signal and the color component continuous pixel number.

* * * * *